United States Patent
Yanagisawa

(10) Patent No.: US 6,882,480 B2
(45) Date of Patent: Apr. 19, 2005

(54) OPTICAL DEVICE, OPTICAL UNIT AND PROJECTOR

(75) Inventor: Yoshiyuki Yanagisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/632,836

(22) Filed: Aug. 4, 2003

(65) Prior Publication Data

US 2004/0046940 A1 Mar. 11, 2004

(30) Foreign Application Priority Data

Aug. 8, 2002  (JP) ........................................ 2002-231123

(51) Int. Cl.[7] ......................... G02B 27/14; G03B 21/00; G03B 21/28
(52) U.S. Cl. ............................ 359/634; 353/33; 353/81
(58) Field of Search ................................ 359/629, 634, 359/636, 638, 640; 353/31, 33, 81; 373/75; 349/9

(56) References Cited

U.S. PATENT DOCUMENTS 5,483,548 A * 1/1996 Coble .......................... 373/75
6,639,743 B1 * 10/2003 Watanabe .................... 359/820

FOREIGN PATENT DOCUMENTS

| JP | A 8-304739   | 11/1996 |
| JP | A 10-10994   | 1/1998  |
| JP | A 2000-221588 | 8/2000  |

* cited by examiner

Primary Examiner—Georgia Epps
Assistant Examiner—Jack Dinh
(74) Attorney, Agent, or Firm—Oliff & Berridge, PLC

(57) ABSTRACT

An optical device (44) is provided with an optical modulator (440), a color combining optical device (444) and an optical converting element (443), the optical modulator (440) being attached to the color combining optical device (444) through a position-adjusting spacer (449) made of a heat-insulative material, so that heat generated on the optical modulator (440) and the optical converting element (443) is mutually insulated by the spacer (449) made of heat-insulative material and does not conduct from high-temperature side to low-temperature side between the optical modulator (440) and the optical converting element (443), thus improving cooling efficiency of the optical modulator (440) to enable size reduction and high luminance of the optical device (44) and a projector.

21 Claims, 19 Drawing Sheets

FIG. 9
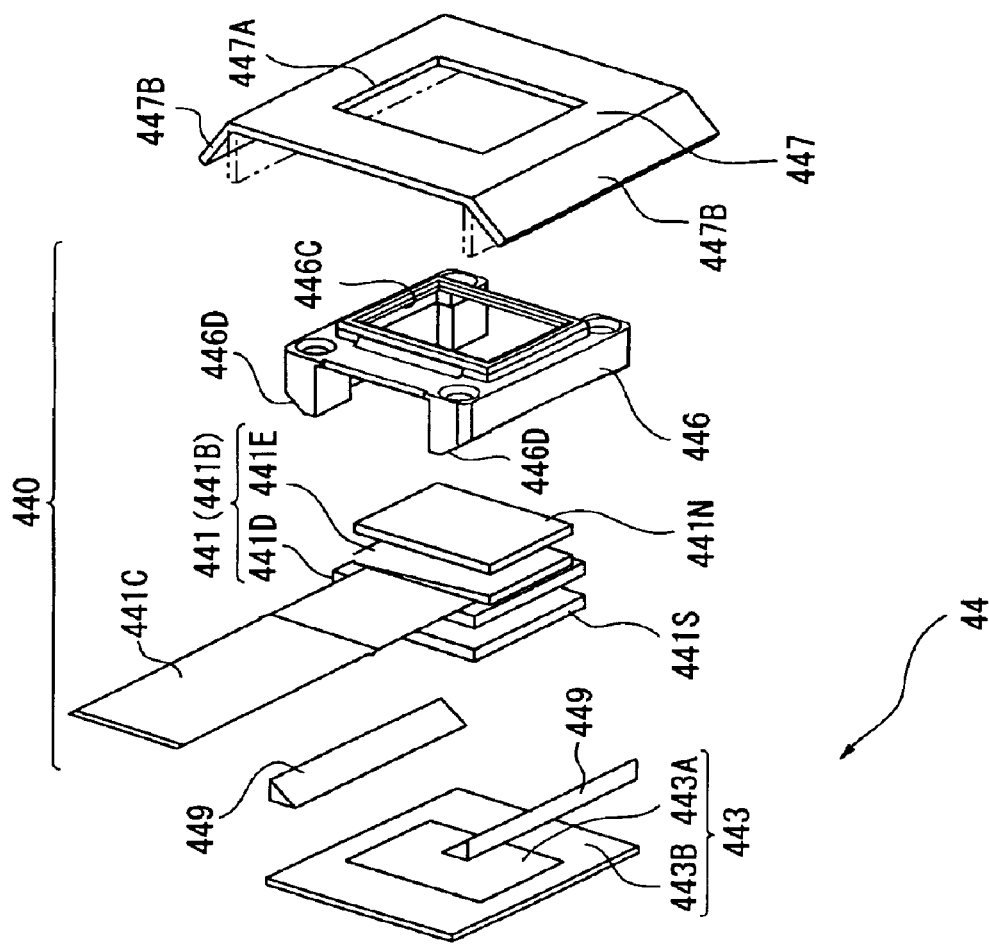
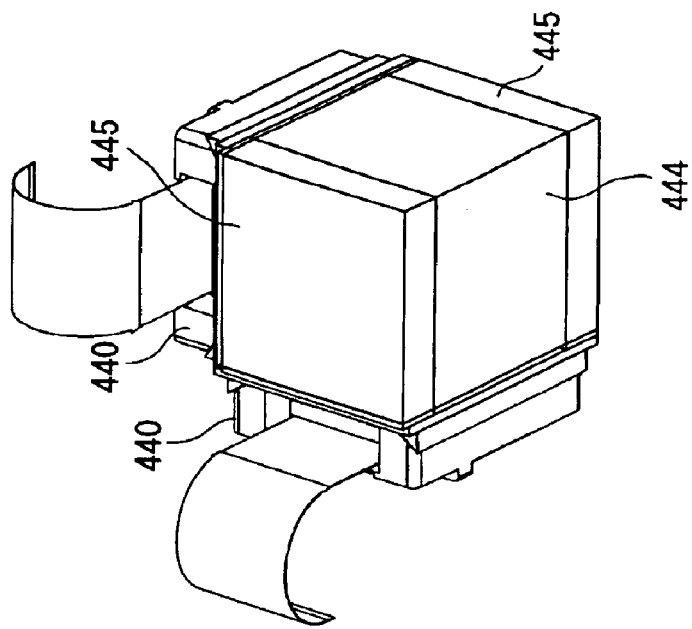

OPTICAL DEVICE, OPTICAL UNIT AND PROJECTOR

BACKGROUND OF THE INVENTION

1. Field of the Invention

The present invention relates to an optical device integrating an optical modulator for modulating color light in accordance with image information and a color combining optical device for combining the color light modulated by the optical modulator, an optical unit provided with the optical device and a projector provided with the optical unit.

2. Description of Related Art

Conventionally, so-called three-plate projector in which a light beam irradiated by a light source is separated into three color-lights of red, green and blue which are modulated by three liquid crystal panels for respective color-lights in accordance with image information and are combined by a cross dichroic prism after being modulated, and a color image is enlarged and projected through a projection lens, is known.

Since the respective liquid crystal panels of such projector have to be located at back-focus position of the projection lens, an optical device having position-adjusted liquid crystal panel directly fixed on the light-incident side of the cross dichroic prism to be integrated has been conventionally used.

In attaching the liquid crystal panel and the cross dichroic prism of the integrated optical device, as shown in Japanese Patent Laid-Open Publication No. 2000-221588, a hole is formed on four corners of a holding frame accommodating the liquid crystal panel and pins are inserted into the holes to attach the liquid crystal panel on the light-incident side of the cross dichroic prism, or alternatively, as shown in Japanese Patent Laid-Open Publication No. Hei 10-10994, a wedge-shaped spacer is interposed between the holding frame and the cross dichroic prism to fix the liquid crystal panel on the light-incident side of the cross dichroic prism.

Such optical device has a polarization plate for aligning polarization direction of the respective color-lights modulated by the liquid crystal panel between the liquid crystal panel and the light-incident side of the cross dichroic prism, the polarization plate being ordinarily attached and fixed on the light-incident side of the cross dichroic prism.

In the optical device integrating the liquid crystal panel, the cross dichroic prism and the polarization plate etc., the liquid crystal panel and the polarization plate heated by irradiating light beam from the light source are forcibly cooled through a gap formed between the liquid crystal panel and the polarization plate by the pin or the spacer, where cooling air is introduced into the gap using an air-cooling fan etc.

However, since the size of the optical device itself is reduced in accordance with recent size reduction and increase in luminance of projector, which results in small gap between the liquid crystal panel and the polarization plate, it is difficult for the cooling air to enter into the gap, thereby lowering cooling efficiency and deteriorating liquid crystal panel and polarization plate.

The cooling efficiency can be improved by increasing the amount of the cooling air flowing through the gap, which, however, increases the noise of the cooling fan. Further, in order to increase the amount of the cooling air, the size of the cooling fan has to be increased, which requires greater size of the projector itself to hinder size reduction of the projector.

Accordingly, an arrangement for the optical device has been proposed, where a base made of material having excellent heat-conductivity such as metal is attached to a side intersecting the light-incident side of the cross dichroic prism, the polarization plate is bonded on the base and the liquid crystal panel is fixed on the polarization plate through a position-adjusting spacer by an adhesive having excellent heat-conductivity.

According to the above optical device, the heat generated on the polarization plate and the liquid crystal panel can be transferred to the base and the base can be forcibly cooled by a fan etc., overheat of the polarization plate and the liquid crystal panel can be prevented.

However, according to the optical device where the heat is transferred to the base, the heat generated on the polarization plate and the liquid crystal panel may not be entirely transferred to the base and the heat may conduct from high-temperature polarization plate to relatively low-temperature liquid crystal panel according to the polarization plate and the liquid crystal panel, so that the temperature of all the polarization plate and the liquid crystal panel may not be securely cooled and sufficient cooling efficiency may not be obtained.

Further, since sufficient cooling efficiency cannot be obtained, size reduction and enhancement in luminance of the projector may be hindered.

SUMMARY OF THE INVENTION

An object of the present invention is to provide an optical device, an optical unit and a projector capable of achieving size reduction and high luminance and capable of obtaining excellent cooling efficiency.

An optical device according to an aspect of the present invention has: a plurality of optical modulators that modulate a plurality of color lights for each color light in accordance with image information; a color combining optical device having a plurality of light-incident sides facing the respective optical modulators, the color combining optical device combining the color lights modulated by the optical modulators, the color combining optical device being integrated with the optical modulators; and an optical modulating element provided between the optical modulator and the light-incident side, the optical modulating element having a substrate on which an optical conversion film that converts optical characteristics of a light beam irradiated by the optical modulator, in which the optical modulator is attached to the color combining optical device through a position-adjusting spacer made of a heat-insulative material.

The optical modulator may preferably be provided with an optical modulating element such as a liquid crystal panel in which a drive substrate and an opposing substrate made of glass etc. are attached through a sealing member retaining a predetermined gap and liquid crystal is sealed in between the substrates.

The optical conversion film may be a film for converting optical function such as polarization film, vision field angle correcting film and retardation film. The substrate may be made of sapphire, quartz glass, crystal and fluorite. Accordingly, the optical converting element may be a polarization plate, a vision field angle correcting plate and a retardation plate. The number of such optical converting element may not be one but may be more than one.

The spacer may be made of heat-insulative resin such as acryl and urethane. The spacer may be configured as a wedge-shaped spacer or a pin spacer, so that the position of the optical modulator relative to the light-incident side of the color combining optical device can be adjusted by the movement of the wedge-shaped spacer or displacement of insert position of the optical modulator relative to the pin spacer, thus appropriately setting the picture element of the projected image or back-focus position from the projection lens.

According to the above arrangement, since the optical device is provided with the optical modulator, the color combining optical device and the optical converting element and the optical modulator is attached to the color combining optical device through the position-adjusting spacer made of heat-insulative material, the heat generated on the optical modulator and the heat generated on the optical converting element by irradiating the light beam from the light source are insulated by the heat-insulative spacer and the heat does not conduct from high-temperature side to low-temperature side between the optical modulator and the optical converting element, thus enhancing cooling efficiency of the optical device.

Further, since the cooling efficiency of the optical device is enhanced, the number of the cooling fan can be reduced and the rotation speed of the cooling fan can be reduced to allow weak cooling air, so that the noise and size of the projector can be reduced.

In the above optical device, the optical converting element may preferably be connected through a heat-conductive material to a base made of a heat-conductive material provided on at least one of a pair of sides of the color combining optical device intersecting the plurality of light-incident sides, and the optical modulator may preferably be connected through a heat-conductive material to an optical component casing accommodating optical components disposed on an optical path from a light source to the optical modulator, at least a part of the optical component casing being made of a heat-conductive material.

The base may preferably be made of a material with high heat-conductivity such as aluminum, magnesium alloy and copper, or sapphire, crystal, fluorite and heat-conductive resin.

The optical component casing may be made of metal with high heat-conductivity such as aluminum, magnesium and alloy thereof. The optical component casing may alternatively be constructed by attaching the above highly heat-conductive metal to a casing body made of synthetic resin.

According to the above arrangement, since the optical converting element is connected with the base of the color combining optical device and the optical modulator is connected with the optical component casing through the heat-conductive material, the optical converting element and the optical modulator of which heat channel is separated by the heat-insulative spacer can independently transfer the heat to the base and the optical component casing, so that the conduction of the heat can be prevented and the optical converting element and the optical modulator can be securely cooled.

In the optical device of the above aspect of the present invention, the optical modulator may preferably have an optical modulating element that conducts optical modulation and an opening corresponding to an image formation area of the optical converting element, and the holding frame may preferably be made of a heat-conductive material.

According to the above arrangement, since the optical modulator is provided with the holding frame made of heat-conductive material, the heat generated on the optical modulating element of the optical modulator can be released to the holding frame, so that the optical modulating element can be securely cooled and deterioration of the optical modulating element can be prevented, thereby enhancing durability thereof.

In the optical device of the above aspect of the present invention, an adhesive receiver that accumulates an adhesive for bonding the optical modulating element may preferably be formed around the opening of the holding frame.

According to the above arrangement, since the optical modulating element can be bonded to the holding frame by the adhesive filled in the holding frame, the optical modulating element can be closely bonded to the holding frame so that the heat of the optical modulating element can be securely transferred to the holding frame. Further, a component such as a support plate used for holding the optical modulating element by sandwiching with the holding frame can be omitted, thereby reducing the number of components.

In the optical device of the present invention, the adhesive receiver may preferably be a consecutive groove or a crater-shaped concave portion arranged in a dotted manner.

According to the above arrangement, since the adhesive receiver is arranged as a groove and a concave portion, air bubble is not likely to be mixed in the adhesive for bonding the optical modulating element, thus improving heat-conductivity between the optical modulating element and the holding frame.

In the optical device according to the above aspect of the present invention, the optical modulator may preferably have a light-transmissive dustproof plate attached to a light-incident and/or light-irradiation surface of the optical modulating element to prevent dusts from adhering on the surface of the optical modulating element, the dustproof plate being connected with the holding frame through a heat-conductive adhesive provided on the outer circumference of the dustproof plate.

According to the above arrangement, since the outer circumference of the dustproof plate attached on the light-incident side and light-irradiation side of the optical modulating element is connected with the holding frame by the heat-conductive adhesive material, the heat transferred from the optical modulating element to the dustproof can be transferred to the holding frame through the heat-conductive adhesive material, so that the heat of the optical modulating element can be further securely transferred to the holding frame. Further, since a part of the light beam transmitting through the dustproof plate can be prevented from being leaked from the outer circumference of the dustproof plate on account of reflection or refraction, thus improving optical quality of the optical device.

In the optical device according to the above aspect of the present invention, heat-conductive adhesive may preferably be any one of silicone adhesive, solder and brazing filler metal.

According to the above arrangement, the outer circumference of the dustproof plate is fixed to the holding frame by bonding with the silicone adhesive, soldering and brazing, the bonding strength of the dustproof plate can be secured while enhancing heat-conductivity between the dustproof plate and the holding frame.

In the optical device according to the above aspect of the present invention, the dustproof plate and the holding frame may preferably be connected through a frame-shaped silicone rubber.

The frame-shaped silicone rubber may be silicone rubber sheet independent of the dustproof plate and holding frame attached to at least one of the dust-proof plate and the holding frame or may be formed by dichroic molding or baking on at least one of the dustproof plate and the holding frame.

According to the above arrangement, since the silicone rubber is interposed between the dustproof plate and the holding frame, the closeness between the components can be enhanced and the heat-conductivity can be improved.

In the optical device according to the above aspect of the present invention, the spacer may preferably have a contact surface having a predetermined area capable of supporting the optical modulator, the contact surface being bonded to the light-incident surface or a substrate surface of the optical modulator by a light-curing adhesive to attach the spacer to the color combining optical device.

According to the above arrangement, since the contact surface of the spacer on the side of the color combining optical device for attaching the optical modulator to the color combining optical device is arranged as a minimum area capable of supporting the optical modulator, the heat conductance between the optical modulator and the color combining optical device, and the optical converting element can be further reduced to prevent heat conduction between the optical modulator and the optical converting element, thus further enhancing the cooling efficiency of the optical device. Further, since the spacer is bonded by a light-curing adhesive, the spacer can be fixed after adjusting the position of the optical modulator by the spacer by curing the adhesive by irradiating ultraviolet etc. to fix the spacer, the assembly work of the optical device can be easily and rapidly conducted.

In the optical device according to the above aspect of the present invention, the optical modulator may preferably have an optical modulating element that conducts optical modulation and a control cable that transfers a control signal for controlling the optical modulation of the optical modulating element, and a heat-conductive coating of a heat-conductive material connected with the optical modulating element may preferably be provided on the control cable.

According to the above arrangement, since the heat-conductive coating connected with the optical modulating element is provided on the control cable of the optical modulator, the heat generated on the optical modulating element can be released through the heat-conductive coating, thus further enhancing the cooling efficiency of the optical modulator.

An optical unit according to another aspect of the present invention has the above optical device, and an optical component casing that accommodates optical components disposed on an optical path from a light source to the optical modulator, at least a part of the optical component casing being made of a heat-conductive material, in which the optical modulator of the optical device is connected with the optical component casing through a heat-conductive plate made of a heat-conductive material.

According to the above arrangement, since the optical modulator is connected with the optical component casing through the heat-conductive plate, the heat generated on the optical modulator can be transferred to the optical component casing having greater heat capacity, thus further securely cooling the optical modulator.

In the optical unit according to the above aspect of the present invention, the optical modulator may preferably have an optical modulating element that conducts optical modulation and a holding frame having an opening corresponding to an image formation area of the optical modulating element, and the heat-conductive plate may preferably be fixed to the holding frame and may preferably be connected with the optical component casing through a heat-conductive elastic material.

According to the above arrangement, since the heat-conductive plate is connected with the optical component casing through the elastic material, heat expansion of the heat-conductive plate on account of the heat generated on the optical modulator is absorbed by the deformation of the elastic material, so that uneven stress is not generated on the heat-conductive plate and the position of the optical modulator is not shifted, thus preventing position shift of the picture element between a plurality of optical modulators.

In the optical unit according to the above aspect of the present invention, the heat-conductive plate may preferably extend along the light-incident surface of the optical modulator and a heat-conductive wall intersecting the direction in which the heat-conductive plate extends to be connected with the optical component casing is provided on the extension of the extending direction of the heat-conductive plate, in which the heat-conductive plate and the wall may preferably be not connected during room temperature condition where no light beam is irradiated on the optical modulator and the heat-conductive plate may preferably be connected with the wall when the heat-conductive plate is thermally expanded by a heat generated by irradiation of a light beam on the optical modulator.

According to the above arrangement, the heat-conductive plate and the wall connected to the optical component casing are not connected during room temperature condition and are connected when the heat-conductive plate is thermally expanded. In other words, since a gap is formed between the distal end in the extending direction of the heat-conductive plate and the wall during the room-temperature condition, no pressure is applied to the heat-conductive plate and shift in picture elements can be prevented.

Further, since the heat-conductive plate is connected directly to the wall or through the elastic material when the heat-conductive plate is thermally expanded by the heat of the optical modulator, the heat can be released to the optical component casing to cool the optical modulator.

Further, in the optical unit according to the above aspect of the present invention, the heat-conductive plate may preferably extend along the light-incident surface of the optical modulator and may preferably have a heat-conductive wall to be connected with the optical component casing along a direction in which the heat-conductive plate extends, and a distal end of the heat-conductive plate in the extending direction may preferably be slidably connected with the wall along the extending direction.

According to the above arrangement, since the distal end in the extending direction of the heat-conductive plate is slidably connected with the wall along the extending direction, the heat expansion of the heat-conductive plate on account of the heat of the optical modulator can be absorbed by the movement of the distal end, so that no pressure is applied to the heat-conductive plate, thereby preventing picture element shift.

Further, since the heat-conductive plate is connected with the wall directly or through the elastic material, the heat can be released to the optical component casing to cool the optical modulator.

In the optical unit according to the above aspect of the present invention, the heat-conductive plate may preferably extend along the light-incident surface of the optical modulator and a heat-conductive wall intersecting the direction in which the heat-conductive plate extends to be connected with the optical component casing may preferably be provided on the extension of the extending direction of the heat-conductive plate, and a bent portion bent at a predetermined angle may preferably be formed on the distal end of the heat-conductive plate in the extending direction, the bent portion being connected with the wall while being biased.

According to the above arrangement, since the bent portion formed on the distal end in the extending direction of the heat-conductive plate is connected with the wall while being biased, the bent portion of the heat-conductive plate is closely attached to the wall or the elastic material, so that the heat channel for releasing the heat to the optical component casing can be secured, thus securely cooling the optical modulator.

In the optical unit according to the above aspect of the present invention, the heat-conductive plate may preferably be connected with the optical component casing through a heat-conductive frame, at least a part of the optical component casing being made of a heat-conductive material, and the heat-conductive frame may preferably be attached to the optical component casing in a manner capable of advancement and retraction along the extending direction of the heat-conductive plate.

According to the above arrangement, since the heat-conductive plate is connected with the optical component casing through the heat-conductive frame attached in a manner capable of advancement and retraction along the extending direction of the heat-conductive plate, the heat expansion of the heat-conductive plate on account of the heat of the optical modulator can be absorbed by the movement of the heat-conductive frame, so that no pressure is applied to the heat-conductive plate and the heat can be released to the optical component casing, thus preventing picture element shift and cooling the optical modulator.

In the optical unit according to the above aspect of the present invention, the heat-conductive plate may preferably be made of a material selected from the group consisting of copper, aluminum, magnesium, and alloy thereof.

According to the above arrangement, since the heat-conductive plate is made of copper, aluminum, magnesium and alloy thereof, heat-conductivity of the heat-conductive plate can be enhanced and, since the resilience of the heat-conductive plate is small, uneven stress generated on the heat-conductive plate on account of heat expansion can be reduced, thereby preventing picture element shift.

A projector according to still another aspect of the present invention modulates a light beam irradiated by a light source in accordance with image information to form an optical image, the projector having an optical unit which includes the above optical device; and an optical component casing that accommodates optical components disposed on an optical path from a light source to the optical modulator, at least a part of the optical component casing being made of a heat-conductive material.

According to the above aspect of the present invention, a projector capable of attaining the same function and advantages as the above optical device can be provided.

Further, with the use of the above optical device, the size of the projector can be reduced and the optical device inside the projector can be securely cooled to lengthen the life of the projector.

A projector according to further aspect of the present invention is for modulating a light beam irradiated by a light source in accordance with image information to form an optical image, the projector including the above optical unit.

According to the above aspect of the present invention, a projector capable of attaining the same function and advantages as the above optical unit can be provided.

Further with the use of the above optical unit, the size of the projector can be reduced and the optical device inside the projector can be securely cooled to lengthen the life of the projector.

A projector according to still further aspect of the present invention is for modulating a light beam irradiated by a light source in accordance with image information to form an optical image, the projector including: the optical unit having an optical device including a control cable provided with the heat-conductive coating; and an optical component casing that accommodates optical components disposed on an optical path from a light source to the optical modulator, at least a part of the optical component casing being made of a heat-conductive material, in which the heat-conductive coating provided on the control cable of the optical device has a distal end branched from the control cable to be connected with an exterior case accommodating the optical unit and/or the optical component casing.

According to the above aspect of the present invention, a projector capable of attaining the same function and advantages as the optical device including the control cable provided with the heat-conductive coating can be provided.

Further, since the heat-conductive coating is connected with the optical component casing and the exterior case, the heat generated on the optical device can be released to the optical component casing and the exterior case having greater heat capacity, so that the optical device can be further securely cooled.

In the projector according the above aspect of the present invention, an exterior case that accommodates the optical unit may preferably be provided, and a gap may preferably be formed between the optical component casing and the exterior case and a cooling fan for sending cooling air to the gap may preferably be provided.

According to the above aspect of the present invention, with the use of the cooling fan for blowing the cooling air to the gap between the optical component casing and the exterior case, the heat generated on the optical modulator and the optical converting element can be radiated by forcible cooling by the cooling fan, natural air-cooling and the above conduction radiation, so that the cooling efficiency of the optical device can be further enhanced, thereby reducing the size of the projector and securely cooling the optical device inside the projector.

BRIEF DESCRIPTION OF THE DRAWINGS

FIG. 9 is an exploded perspective view showing a structure of an optical device integrating the liquid crystal panel and the prism of the aforesaid embodiment;

DETAILED DESCRIPTION OF PREFERRED EMBODIMENT(S)

[First Embodiment]

A projector according to a first embodiment of the present invention will be described below with reference to attached drawings.

[1-1 Primary Arrangement of Projector]

Figure 1:
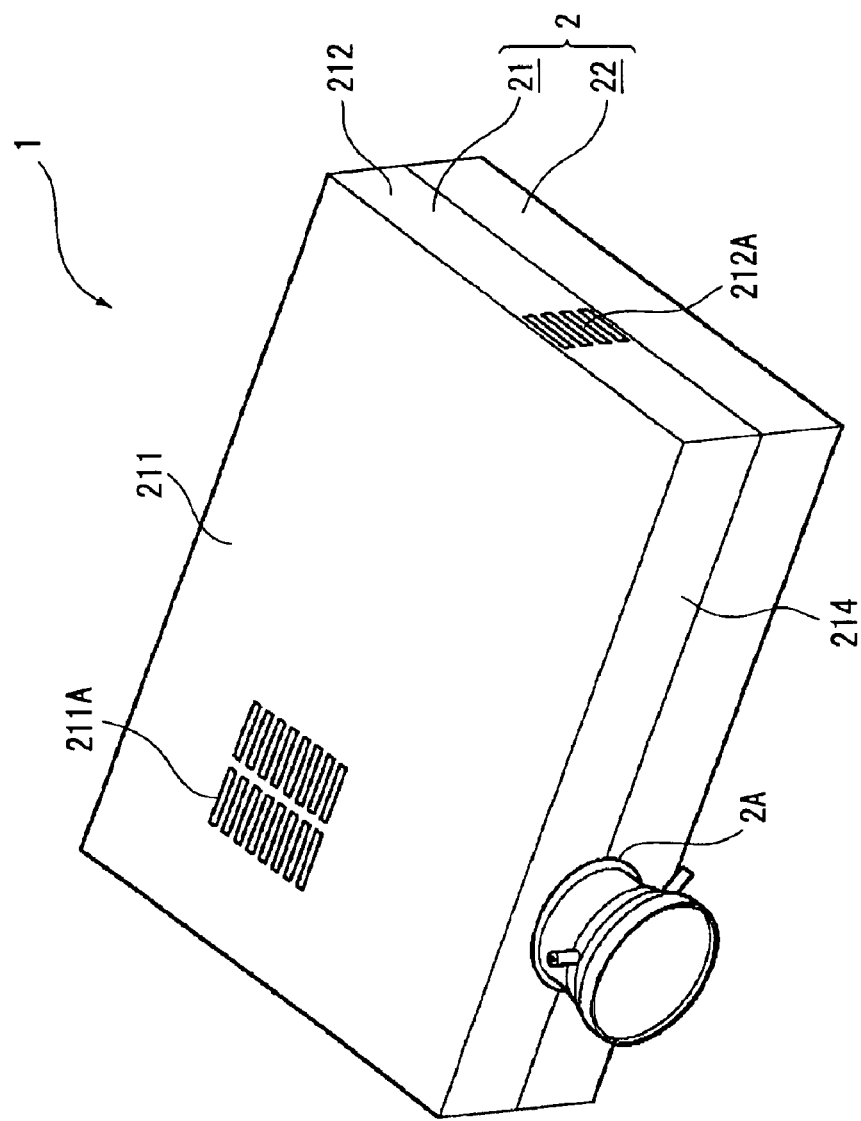
FIG. 1 is an entire perspective view of a projector seen from above according to a first embodiment of the present invention.
Figure 2:
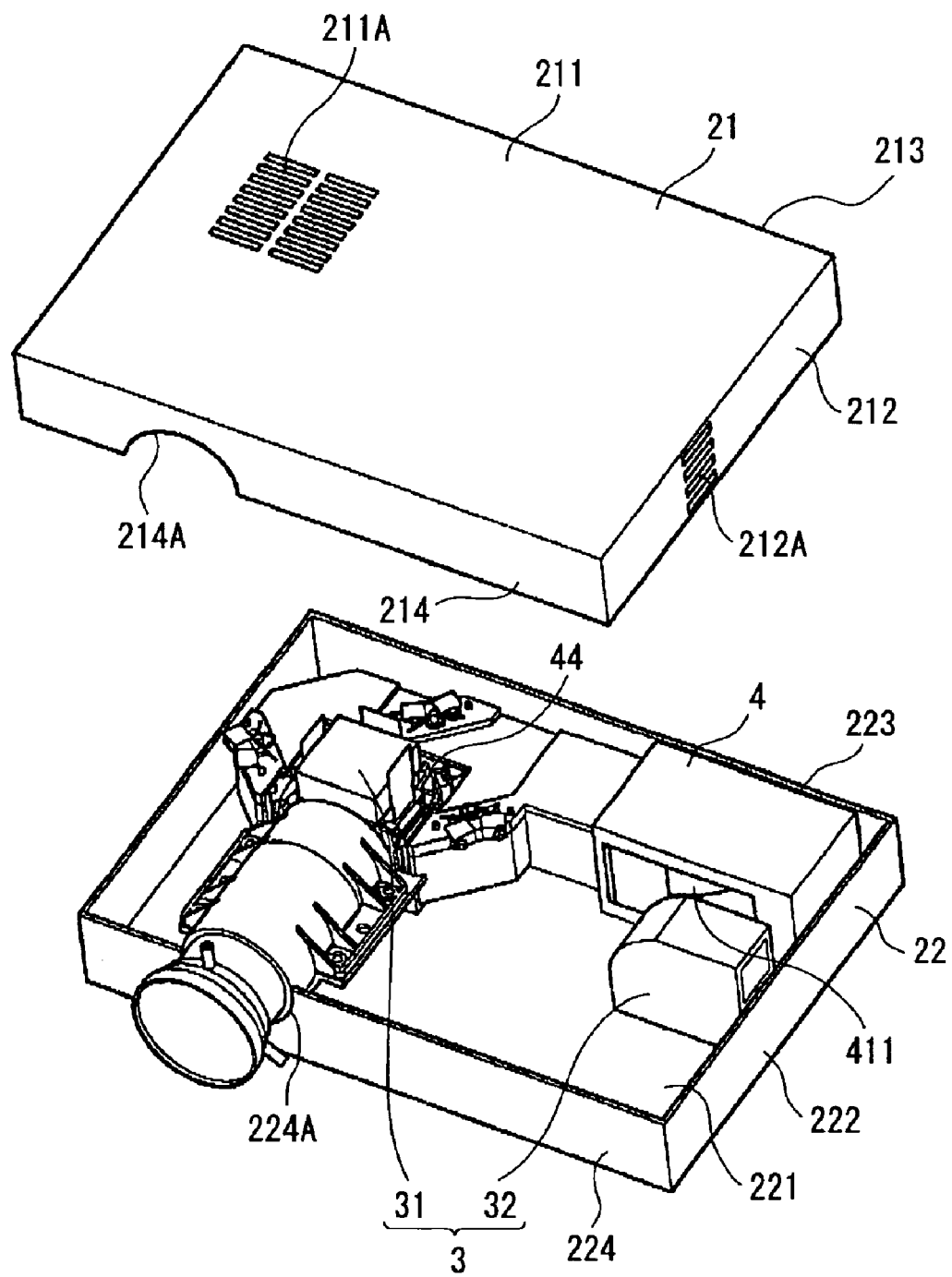
FIG. 2 is an illustration of interior of the projector of the aforesaid embodiment, which specifically is an exploded perspective view where an upper case of FIG. 1 is removed.

FIG. 1 is an entire perspective view seen from above showing a projector 1 according to first embodiment of the present invention, and FIG. 2 is an exploded perspective view with an upper case 21 being detached from FIG. 1.

The projector 1 has an approximate rectangular parallelepiped exterior case 2, a cooling unit 3 for cooling the heat in the projector 1, and an optical unit 4 for optically processing a light beam irradiated by a light source to form an optical image corresponding to image information.

Incidentally, though not specifically shown in FIG. 2, a power source block and a lamp driving circuit etc. are accommodated in the space in the exterior case 2 except for the optical unit 4.

The exterior case 2 has an upper case constituting the top side, front side and lateral sides of the projector 1 and a lower case 22 constituting the bottom side, the lateral side and the rear side of the projector 1, the upper case 21 and the lower case 22 being made of metal. The cases 21 and 22 are mutually screwed.

The upper case 21 has an upper side 211, and lateral sides 212, a rear side 213 and a front side 214 provided around the upper side 211.

An intake port 211A located above the below-described optical device for drawing the cooling air from the outside by the cooling unit 3 is provided on the upper side 211.

An exhaust port 212A for discharging the air heated inside the projector 1 through the cooling unit 3 is provided on the lateral side 212 (on the right side seen from front side).

Though not specifically illustrated, various connector terminals such as connector for a computer, video input terminal and audio connector terminal are provided on the rear side 213, and an interface board installed with a signal processing circuit for processing signal such as image signal is disposed inside the rear side 213.

A cut 214A is formed on the front side 214, which forms a circular opening 2A when the upper case 21 is combined with the lower case 22, the opening 2A exposing a part of the optical unit 4 disposed inside the exterior case 2 toward the outside. An optical image formed by the optical unit 4 is irradiated through the opening 2A to display an image on a screen.

The lower case 22 is composed of a bottom portion 221, a lateral side 222, a rear side 223 and a front side 224 provided therearound.

Though not specifically illustrated, an opening located below the optical unit 4 for attaching and detaching a below-described light source is formed on the bottom side 221, the opening being covered by a lamp cover fitted in a detachable manner.

A cut 224A is formed on the front side 224, which forms the circular opening 2A together with the above-described cut 214A when the lower case is combined with the upper case 21.

The cooling unit 3 sends the cooling air to the cooling channel formed inside the projector 1 to cool the heat generated in the projector 1, which includes an axial-flow fan 31 for drawing in the cooling air from the intake port 211A formed on the upper side 211 of the upper case 21, and a sirocco fan 32 located around a light source 411 of the optical unit 4 for drawing the air inside the optical unit 4 and the projector 1 to discharge the heated air through the exhaust port 212A formed on the lateral side 212 of the upper case 21.

The optical unit 4 optically processes the light beam irradiated by the light source 411 to form an optical image corresponding to image information, which is configured in approximately planarly-viewed L-shape extending from the right lateral side 222 of the lower case 22 along the rear side 223 and further along the left lateral side 222 to the front side 214 as shown in FIG. 2.

Though not specifically illustrated, the optical unit 4 is electrically connected with a power source from which electric power is supplied through a power cable for supplying the electric power to the light source 411 of the optical unit 4.

Further, a control board for controlling respective liquid crystal panels 441R, 441G and 441B as the below-described optical modulator for importing the image information to conduct control and processing to project an optical image in accordance with image information is disposed above the optical unit 4.

[1-2. Detailed Arrangement of Optical System]

Figure 3:
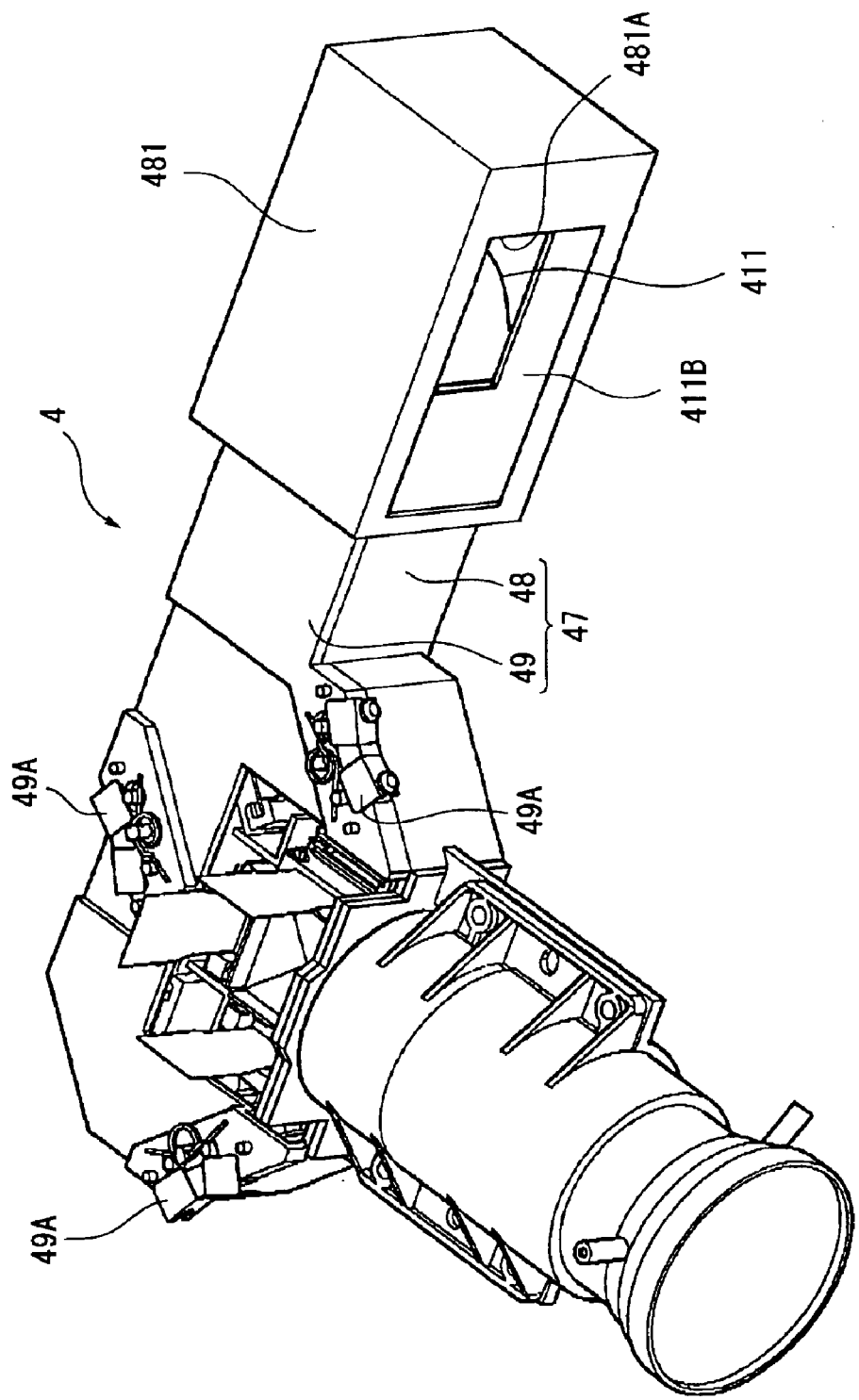
FIG. 3 is an entire perspective view of an optical unit of the aforesaid embodiment seen from above.
Figure 4:
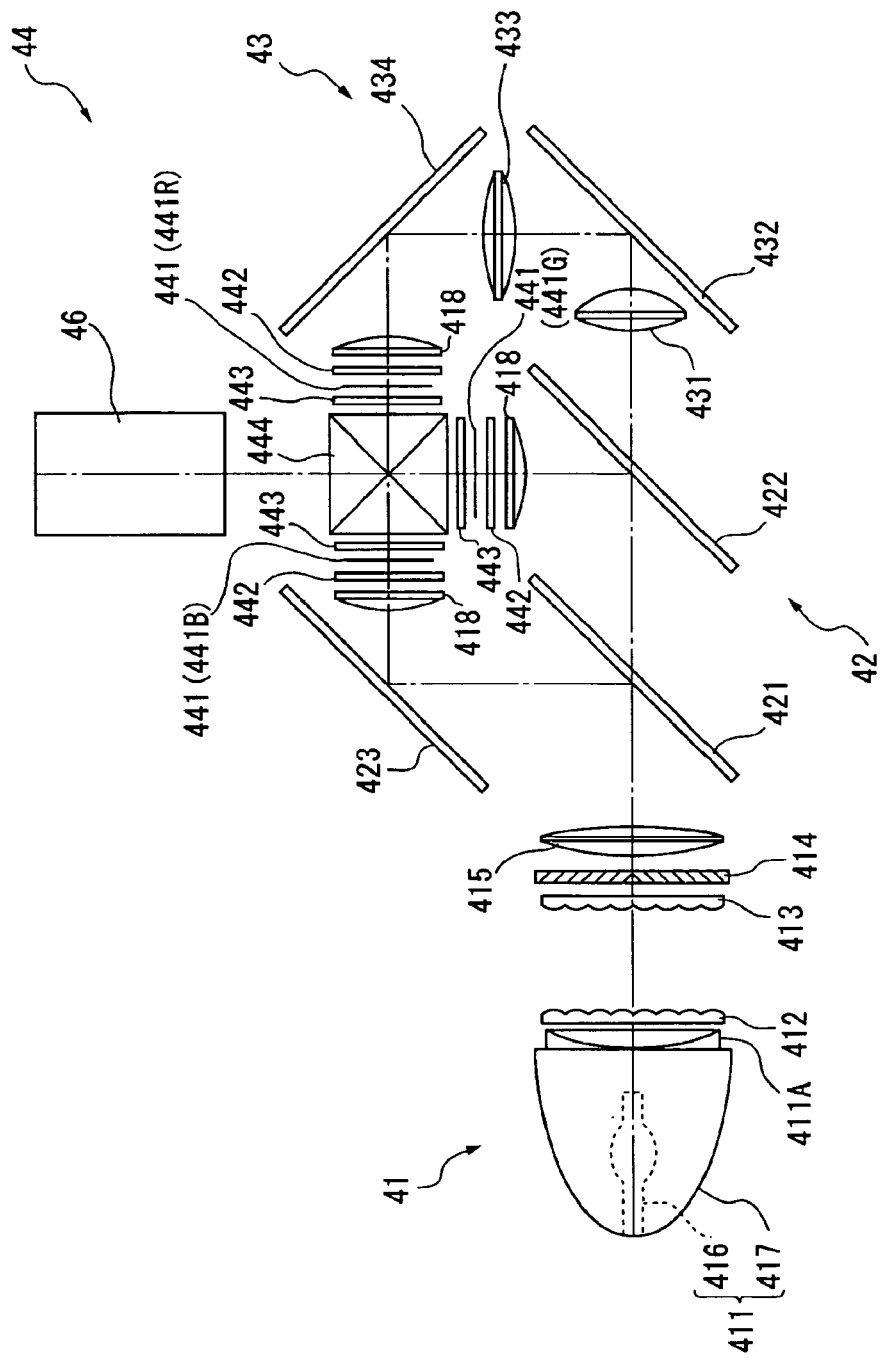
FIG. 4 is a plan view schematically showing an optical system of a projector of the aforesaid embodiment.

FIG. 3 is an entire perspective view seen from above showing the optical unit 4. FIG. 4 is a plan view schematically showing the optical system inside the optical unit 4.

As shown in FIG. 4, the optical unit 4 has an integrator illuminating optical system 41, a color separating optical system 42, a relay optical system 43, an optical device 44 and a projection lens 46. The optical components are installed in a light guide 47 as an optical component casing as shown in FIG. 3.

In FIG. 4, the integrator illuminating optical system 41 is for approximately uniformly illuminating the image formation area of three liquid crystal panels 441 constituting the optical device 44 (respectively indicated as liquid crystal panels 441R, 441G and 441B for each color light of red, green and blue), which includes the light source 411, the first lens array 412, the second lens array 413, the polarization converting optical element 414 and a superposing lens 415.

The light source 411 has a light source lamp 416 for irradiating radial light beam, an ellipsoidal mirror 417 for reflecting the radial light irradiated by the light source lamp 416, and a concave lens 411A for parallelizing the light beam irradiated by the light source lamp 416 and reflected by the ellipsoidal mirror 417. Non-illustrated UV filter is provided on the flat portion of the concave lens 411A. A halogen lamp, metal halide lamp and high-pressure mercury lamp are often used as the light source lamp 416. A parabolic mirror may be used instead of the ellipsoidal mirror 417 and the concave lens 411A.

The first lens array 412, the second lens array 413 and the polarization converting optical element 414 are integrally combined and are disposed and fixed inside the casing.

The first lens array 412 has a plurality of small lenses arranged in matrix, the lenses having approximately rectangular profile seen in optical axis direction. The respective lenses separates the light beam irradiated by the light source lamp 416 into a plurality of sub-beams. The profile of the respective small lenses is approximately similar to the shape of the image formation area of the liquid crystal panel 441. For instance, when the aspect ratio (ratio of horizontal and vertical dimension) of the image formation area of the liquid crystal panel 441 is 4:3, the aspect ratio of the respective lenses is also set as 4:3.

The second lens array 413 is arranged approximately the same as the first lens array 412, which includes small lenses arranged in matrix. The second lens array 412 focuses the image of the small lenses of the first lens array 412 on the liquid crystal panel 441 together with the superposing lens 415.

The polarization converting optical element 414 is disposed between the second lens array 413 and the superposing lens 415 and is integrated with the second lens array 413 as a unit. The polarization converting optical element 414 converts the light beam from the second lens array 413 into a uniform polarization light to enhance light utilization efficiency of the optical device 44.

Specifically, the respective sub-beams converted into a uniform polarization light by the polarization converting optical element 414 is substantially superposed on the liquid crystal panels 441R, 441G and 441B of the optical device 44 by the superposing lens 415. Since only a single polarization light can be used in a projector using a liquid crystal panel that modulates polarization light, approximately half of the light from the light source lamp 416 irradiating random polarization light cannot be used.

Accordingly, the polarization converting optical element 414 is provided to convert the light irradiated by the light source lamp 416 into approximately uniform polarization light to enhance the light utilization efficiency of the optical device 44. Incidentally, such polarization converting optical element 414 is disclosed in Japanese Patent Laid-Open Publication No. Hei 8-304739, for instance.

The color separating optical system 42 has two dichroic mirrors 421 and 422 and a reflection mirror 423, the dichroic mirrors 421 and 422 separating the plurality of sub-beams irradiated by the integrator illuminating optical system 41 into three color lights of red, green and blue.

The relay optical system 43 has an incident-side lens 431, a relay lens 433 and reflection mirrors 432 and 434, which guides the color light, red light, for instance, separated by the color separating optical system 42 to the liquid crystal panel 441R.

At this time, the dichroic mirror 421 of the color separating optical system 42 reflects the blue light component of the light beam irradiated by the integrator illuminating optical system 41 and transmits the red light component and green light component. The blue light reflected by the dichroic mirror 421 is reflected by the reflection mirror 423 to reach the blue-color liquid crystal panel 441B through a field lens 418. The field lens 418 converts the respective sub-beams irradiated by the second lens array 413 into a light beam parallel to the central axis (main beam) thereof. The field lenses 418 provided on the light-incident side of the other liquid crystal panels 441G and 441R function in the same manner.

The red light and green light transmits through the dichroic mirror 421, where the green light is reflected by the dichroic mirror 422 to reach the liquid crystal panel 441G for green-color through the field lens 418. On the other hand, the red light is transmitted through the dichroic mirror 422 to pass the relay optical system 43 and reach the liquid crystal panel 441R for red color through the field lens 418. Incidentally, the relay optical system 43 is used for red light in order to prevent decrease in the light utilization efficiency caused by light dispersion generated on account of longer optical path of the red light than the optical path of the other color lights. In other words, the relay optical system 43 is used for directly transmitting the sub-beams incident on the incident-side lens 431 to the field lens 418.

Incidentally, though the red light is transmitted through the relay optical system 43, blue light may be transmitted therethrough, for instance.

The optical device 44 is an integrated unit constructed of liquid crystal panels 441R, 441G and 441B as optical modulating element of the three optical modulators 440 (FIGS. 8 and 9) and a cross dichroic prism 444 as a color combining optical device. The liquid crystal panels 441R, 441G and 441B use polycrystalline silicon TFT as a switching element, and the respective color lights separated by the color separating optical system 42 are modulated by the three liquid crystal panels 441R, 441G and 441B and a polarization plate 442 located on light-incident side and polarization plate 443 located on light-irradiation side thereof to form an optical image in accordance with image information.

Though described below in detail, the liquid crystal panels 441R, 441G and 441B includes a drive board on which the switching element of TFT are arranged in matrix and a picture element electrode to which voltage is applied by the switching element, and a opposing board having an opposing electrode corresponding to the picture element electrode.

The cross dichroic prism 444 combines the image modulated for respective color lights irradiated by the three liquid crystal panels 441R, 441G and 441B to form a color image. Incidentally, dielectric multi-layer film for reflecting red light and another dielectric multi-layer film reflecting blue light are formed along the boundary of four right-angle prisms in approximately X-shape, the dielectric multi-layer films combining three color lights. The color image combined by the prism 444 is irradiated by the projection lens 46 to be enlarged and projected on a screen.

[1-3. Structure of Optical Component Casing]

As shown in FIG. 3, the above-described respective optical systems 41 to 44 are accommodated in a metal light guide 47 as an optical component casing.

The light guide 47 has a lower light guide defining bottom, front and lateral sides of the light guide 47 and a lid-shaped upper light guide 49 closing an opening on the lower light guide 48.

Figure 5:
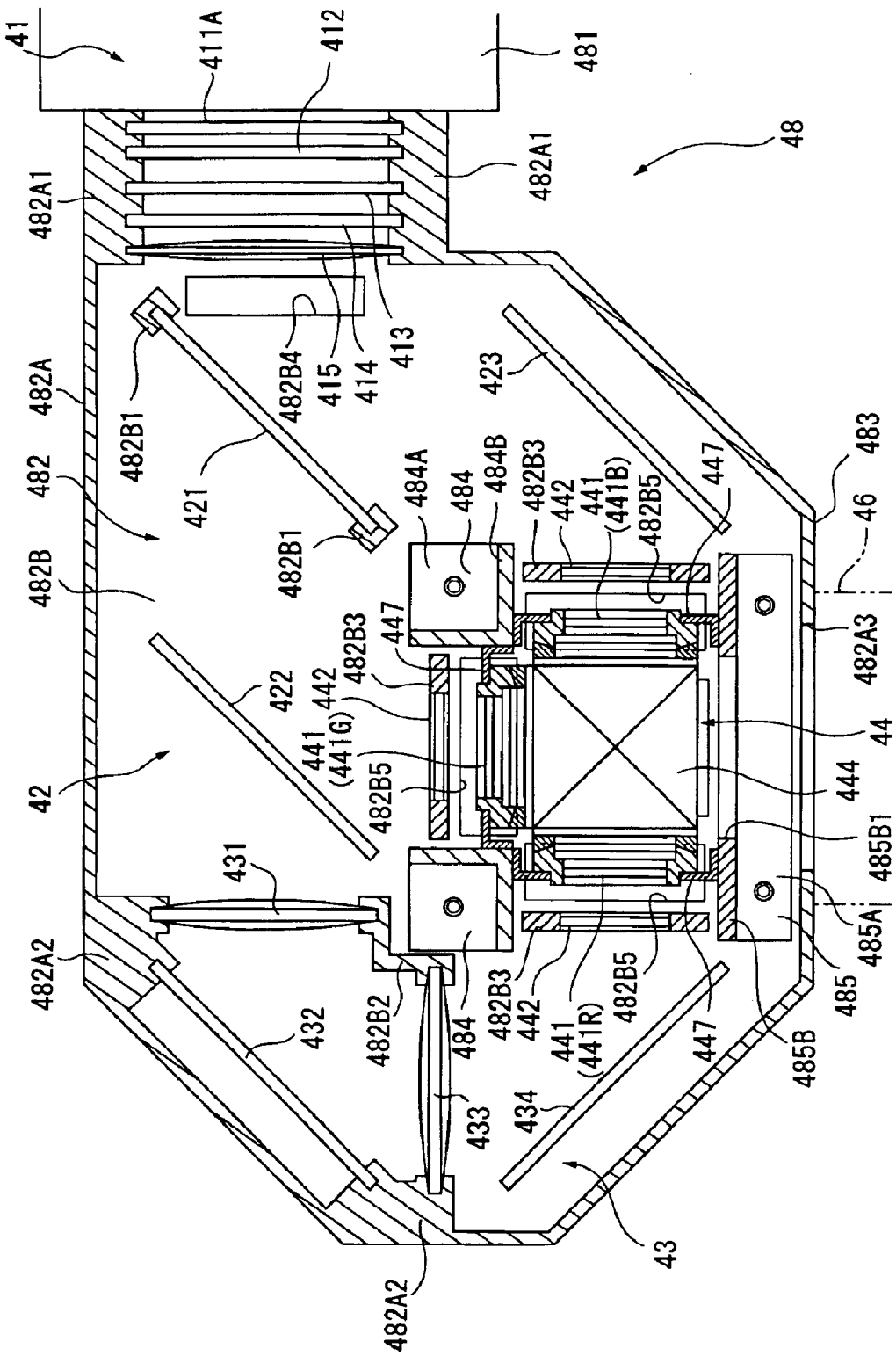
FIG. 5 is a plan view showing an interior of a light guide of the aforesaid embodiment.

FIG. 5 is a plan view showing the interior of the light guide 47.

Figure 6:
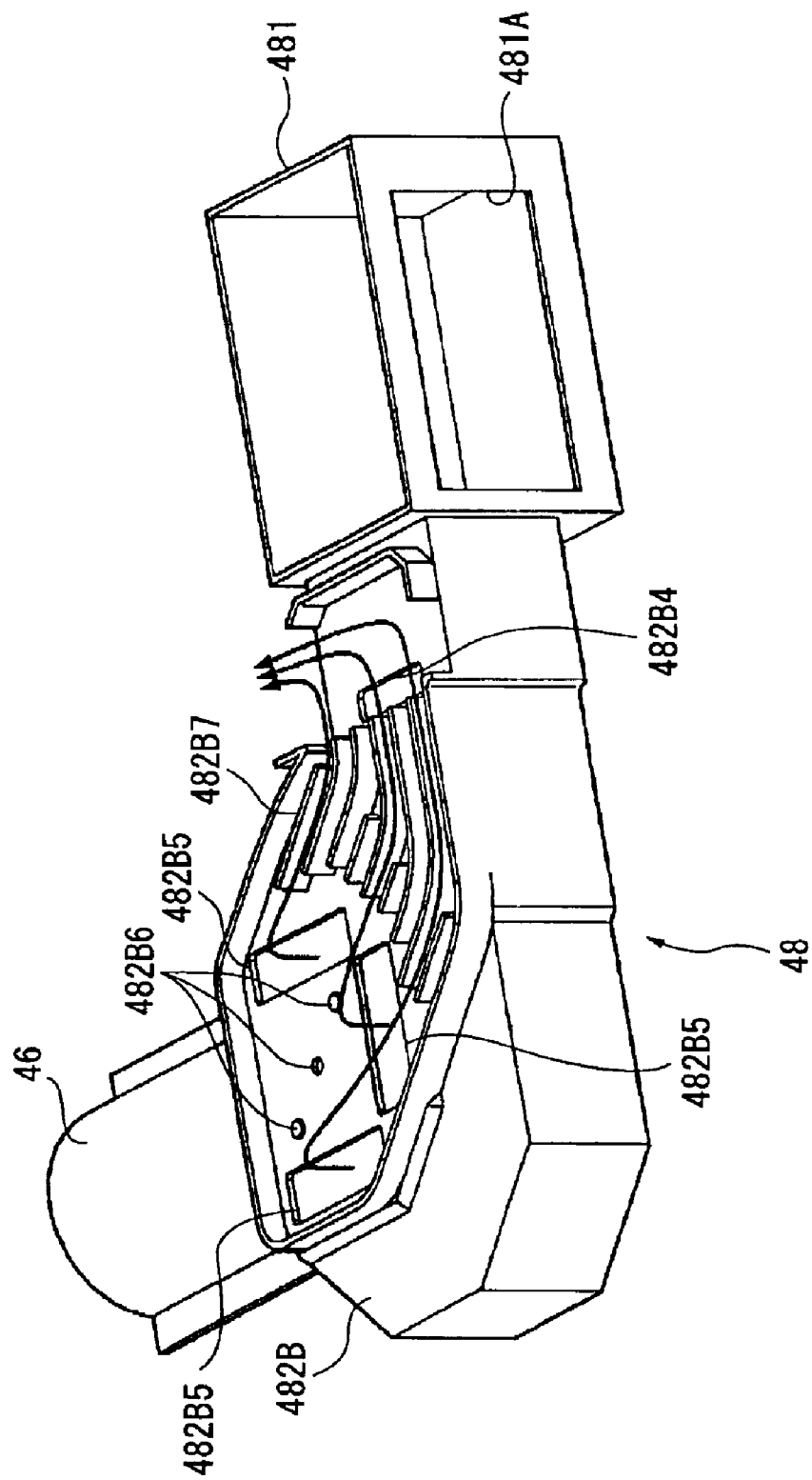
FIG. 6 is an entire perspective view seen from below showing a lower light guide of the aforesaid embodiment.

FIG. 6 is an entire perspective view showing the lower light guide 48 seen from lower side.

In FIGS. 5 and 6, the lower light guide 48 has a light source accommodating portion 481 for accommodating the light source 411, an optical component casing 482 for accommodating the light source 481, an optical component accommodating portion 482 for accommodating the optical components 411A, 412 to 415 and 42 to 44, and a projection optical system mount portion 483 for mounting the projection lens 46.

As shown in FIG. 6, the light source accommodating portion 481 has an open bottom and is shaped in a box having a rectangular opening 481A, which accommodates the light source 411 to the light source accommodating portion 481.

As shown in FIG. 3, the light source 411 is mounted on a fixing plate 411B and is accommodated in the light source accommodating portion 481 together with the fixing plate 411B from the lower side of the light source accommodating portion 481.

The fixing plate 411B has different height along the light beam irradiated by the light source 411, where the height from the center of the ellipsoidal mirror 417 of the light source 411 toward the front side is approximately the same as the height of the light source 411 and the rear side thereof is smaller than the height of the light source 411.

When the light source 411 is accommodated in the light source accommodating portion 481 of the lower light guide 48 together with the fixing plate 411B, the front side of the light source 411 is closed by the opening 481A and the fixing plate 411B formed on the light source accommodating portion 481 and the rear side is in communication with the outside of the light source 411.

Since the front side of the light source 411 is closed, leakage of the light beam irradiated by the light source 411 toward the outside can be prevented and, since the rear side is in communication with the outside of the light source 411, the heat generated by the light source 411 does not stay inside the light source accommodating portion 481.

As shown in FIG. 5, the optical component accommodating portion 482 has a lateral side 482A and a bottom side 482B.

A unit constructed by the concave lens 411A, the first lens array 412, the second lens array 413 and the polarization converting optical element 414, a first groove 482A1 for the superposing lens 415 to be slidably fitted from the above, and a second groove 482A2 for the incident-side lens 431, the reflection mirror 432 and the relay lens 433 to be slidably fitted from the above are formed on the inner surface of the lateral side 482A.

A circular hole 482A3 corresponding to light-irradiating position of the optical device 44 is formed on the front portion of the lateral side 482A, where the image light enlarged and projected by the projection lens 46 is displayed on a screen through the hole 482A3.

A first boss 482B1 supporting the dichroic mirror 421 and a second boss 482B2 having a groove corresponding to the second groove 482A2 projects from the bottom side 482B. A polarization plate holder 482B3 supporting a polarization plate 442 located on the light-incident side of the liquid crystal panel 441 of the optical device 44 projects from the bottom side.

On the bottom side 482B, an intake port 482B4 for cooling the unit including the polarization converting optical element 414, an exhaust port 482B5 formed corresponding to the position of the liquid crystal panel 441 of the optical device 44 and a hole 482B6 for mounting the optical device 44 at a portion surrounded by the exhaust port 48B5 are formed.

Further, as shown in FIG. 6, a duct 482B7 as a gap for introducing the air discharged through the exhaust port 482B5 to the outside when the lower light guide 48 abuts to the bottom side 221 of the lower case 22 is formed on the backside of the bottom side 482B.

As shown in FIG. 3, the upper light guide 49 closes the upper opening of the lower light guide 48 except for the upper side of the optical device 44 and supports the optical components not supported by the first groove 482A1 and the second groove 482A2 on the lower light guide 48, i.e. the reflection mirror 423, the dichroic mirror 422 and the reflection mirror 434.

An adjuster 49A is disposed at a position corresponding to the optical components of the lower light guide 49 so that the attitude of the optical components and the illuminating optical axis of the respective color lights can be adjusted.

As shown in FIG. 5, heat-conductive frames 484 and 485 are attached to the bottom side 482B corresponding to the liquid crystal panel 441 of the optical device 44 in a manner capable of advancement and retraction along the bottom side 482B. Specifically, the heat-conductive frame 484 is provided on a side of the liquid crystal panels 441R and 441G and on a side of the liquid crystal panels 441G and 441B, and the heat-conductive frame 485 is located on a side of the liquid crystal panels 441R and 441B and on the light-irradiation side of the optical device 44.

The heat-conductive frames 484 and 485 are made of material having high heat-conductivity such as metal, e.g. aluminum alloy, and heat-conductive resin, which include attachment portions 484A and 485A extending along the bottom side 482B of the lower light guide 48 and walls 484B and 485B as wall body.

The walls 484B and 485B of the heat-conductive frames 484 and 485 mutually oppose sandwiching the liquid crystal panel 441, where below-described heat-conductive plate 448 is in contact with the walls 484B and 485B. Rectangular hole 485B1 corresponding to the light irradiating position of the optical device 44 is formed on the wall 485B of the heat-conductive frame 485.

Figure 7:
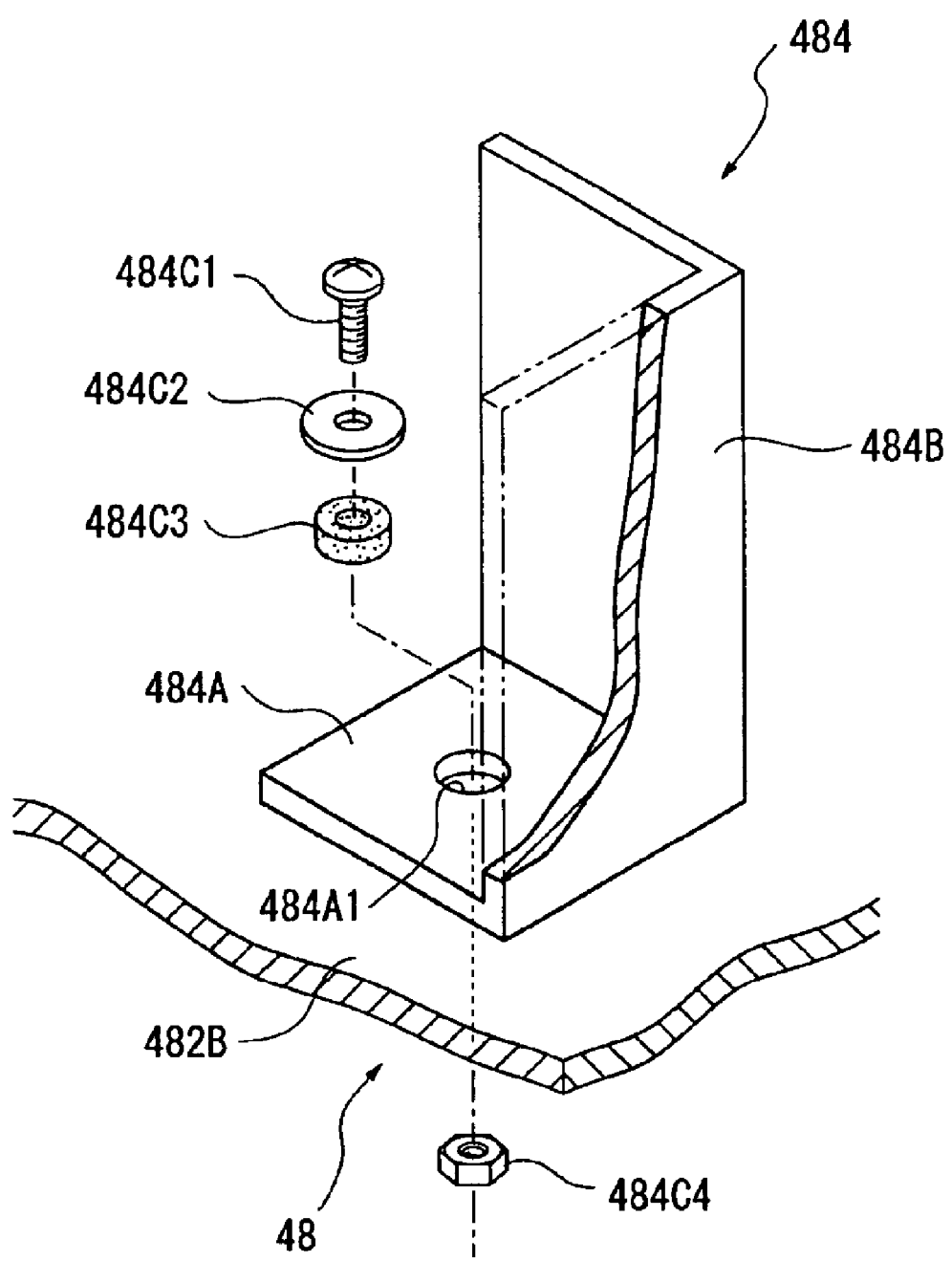
FIG. 7 is an exploded perspective view showing an attachment structure of a heat-conductive frame of the aforesaid embodiment.

FIG. 7 is an exploded perspective view of the heat-conductive frame 484.

In FIG. 7, the heat-conductive frame 484 is attached to the bottom side 482B of the lower light guide 48 through an insert hole 484A1 provided on the attachment portion 484A by a screw 484C1, a washer 484C2, an elastic ring 484C3 and a nut 484C4.

The elastic ring 484C3 is made of elastic material such as rubber and synthetic resin and is shaped in a ring having approximately the same outer diameter as the insert hole 484A1 and inner diameter adapted to be in close contact with the shaft of the screw 484C1.

The washer 484C2 has greater outer diameter than the insert hole 484A1, which restricts the vertical movement of the attachment portion 484A when the screw 484C1 and the nut 484C4 are fastened.

Accordingly, the heat-conductive frame 484 is capable of advancement and retraction along the bottom side 482B in accordance with deformation of the elastic ring 484C3 and is capable of returning to a predetermined attachment position by the elastic force of the elastic ring 484C3.

[1-4. Structure of Optical Device]

Figure 8:
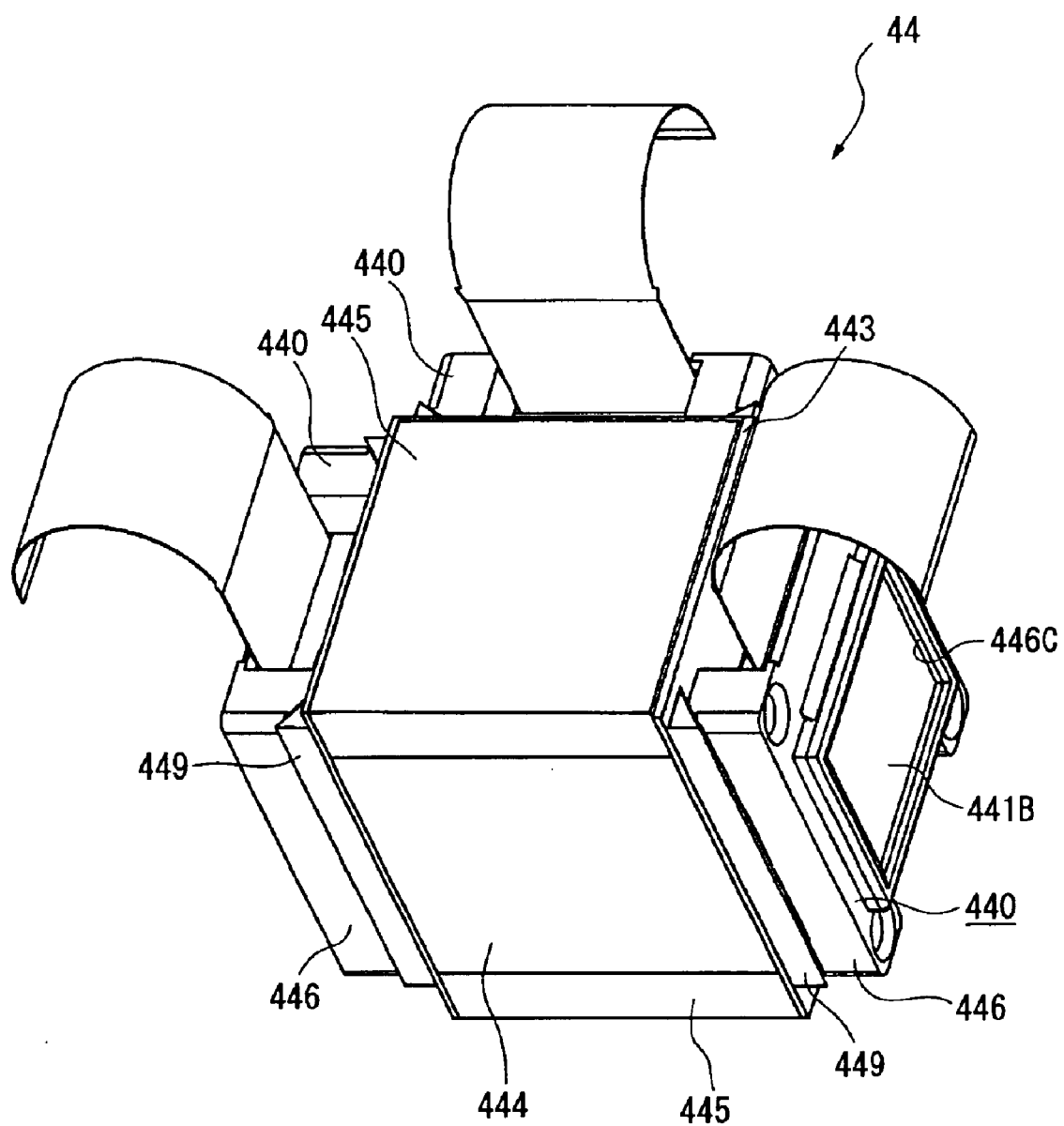
FIG. 8 is an entire perspective view seen from above showing an optical device integrating a liquid crystal panel and a prism of the aforesaid embodiment.
Figure 10:
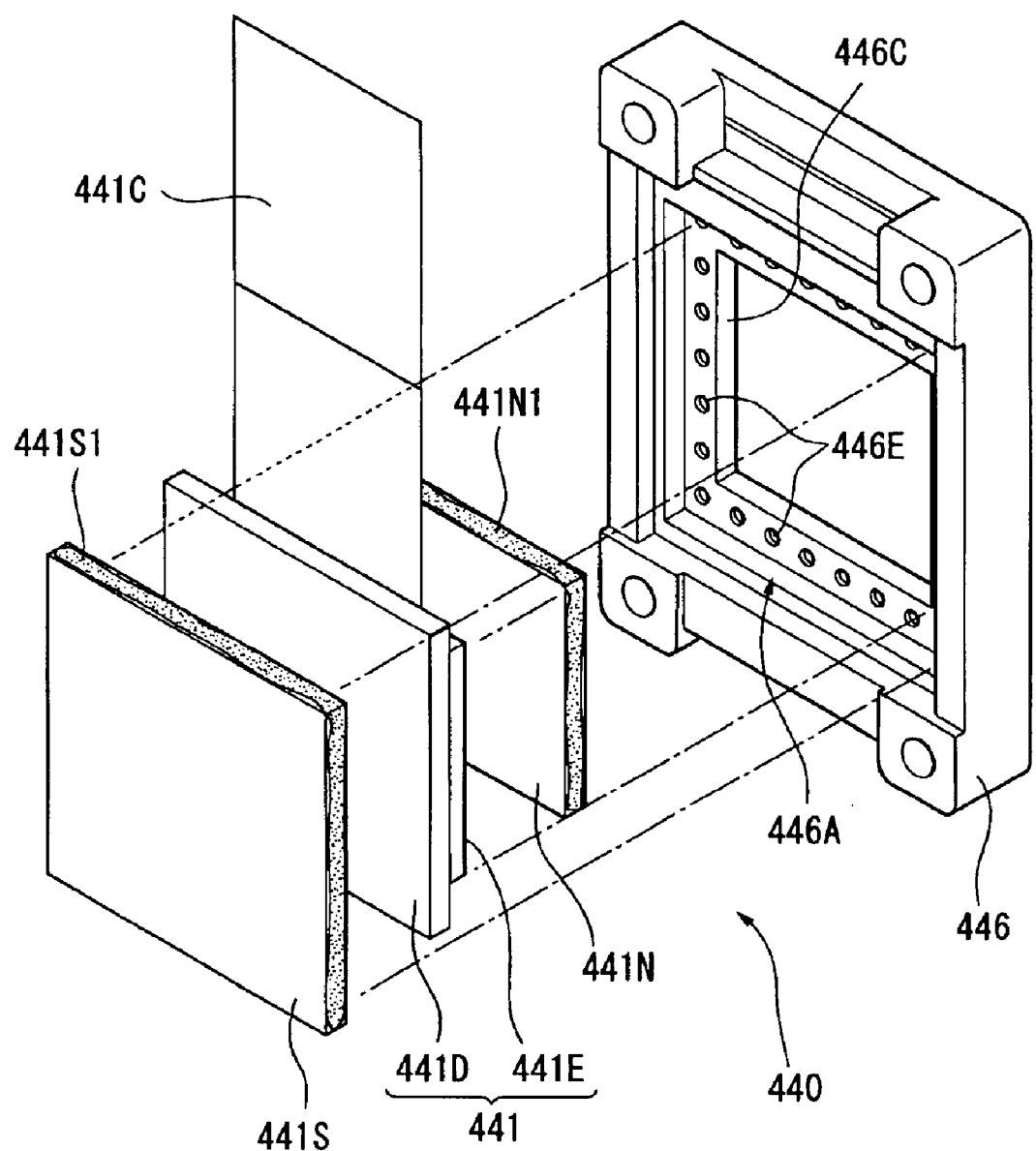
FIG. 10 is an exploded perspective view showing the structure of the liquid crystal panel of the aforesaid embodiment.
Figure 11:
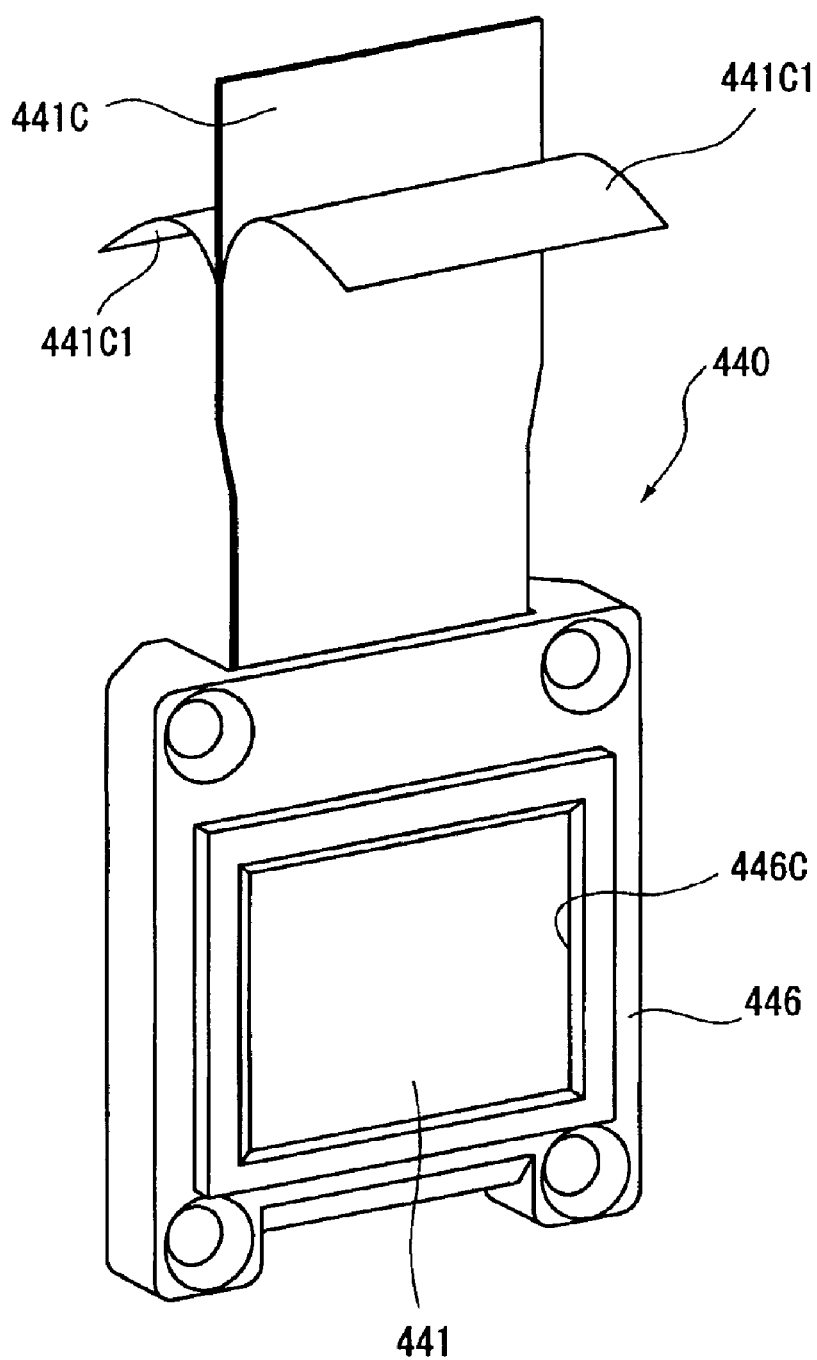
FIG. 11 is an entire perspective view seen from above showing the liquid crystal panel of the aforesaid embodiment.

FIG. 8 is an entire perspective view showing the optical device 44 from the upper side. FIG. 9 is an exploded perspective view of the optical device 44. FIG. 10 is an exploded perspective view of the optical modulator 440. FIG. 11 is an entire perspective view of the optical modulator 440.

Incidentally, the liquid crystal panel 441B side of the optical device 44 is exploded in FIG. 9. Since the sides of the liquid crystal panels 441R and 4416 are the same as the side of the liquid crystal panel 441B, description thereof is omitted.

The optical device 44 modulates the light beam irradiated by the light source lamp 416 in accordance with image information and combines the modulated color light to project as an optical image, which includes an optical modulator 440, the polarization plate 443 as an optical converting element for aligning the polarization direction of the respective color lights irradiated by the optical modulator 440 and a cross dichroic prism 444 for combining the respective color lights transmitted through the polarization plate 443. Bases 445 are fixed on top and bottom sides (a pair of surfaces approximately orthogonal with the light-incident side). A wedge-shaped spacer 449 is interposed between the polarization plate 443 and the optical modulator 440.

The optical modulator 440 includes the liquid crystal panels 441R, 441G and 441B for modulating the light beam irradiated by the light source lamp 416 in accordance with image information and a holding frame 446 for holding the respective liquid crystal panels 441R, 441G and 441B.

As shown in FIG. 9, the liquid crystal panel 441B has glass substrate composed of a drive substrate (such as TFT substrate) 441D and an opposing substrate 441E between which liquid crystal is sealed, and a control cable 441C extends from between the glass substrates.

As shown in FIG. 11, the control cable 441C is provided with heat-conductive coating 441C1 on both sides thereof. The heat-conductive coating 441C1 is a film made of heat-conductive resin etc, which is adhered to the control cable 441C so that the base end thereof touches the drive substrate 441D and the opposing substrate 441E. Further, a distal end of the heat-conductive coating 441C1 is branched from the control cable 441C at a predetermined position.

As shown in FIGS. 9 and 10, an irradiation-side dustproof plate 441S and incident-side dustproof plate 441N are fixed on the surface of the drive substrate 441D and the opposing substrate 441E.

The irradiation-side dustproof plate 441S and the incident-side dustproof plate 441N are made of plate body having excellent heat-conductivity such as sapphire and quartz, which shifts the position of panel surface of the liquid crystal panel 441 from the back-focus position of the projection lens 46 on the light-irradiation side and light-incident side of the liquid crystal panel 441 so that the dust adhered on the panel surface becomes optically dimmer.

The holding frame 446 has an accommodating portion 446A for accommodating the liquid crystal panel 441, where the surface or outer circumference of the drive substrate 441D, irradiation-side dustproof plate 441F and incident-side dustproof plate 441N are adhered to the accommodating portion 446A to accommodate the liquid crystal panel 441.

Further, the holding frame 446 has an opening 446C at a position corresponding to the panel surface of the accommodated liquid crystal panel 441.

The respective liquid crystal panels 441R, 441G and 441B are exposed at an opening 446C of the holding frame 446 to define the image formation area. Specifically, the respective color lights R, G and B are introduced to the portion of the respective liquid crystal panels 441R, 441G and 441B to form an optical image in accordance with image information.

Such holding frame 446 is made of heat-conductive resin containing carbon, titanium, aluminum and silicon fluoride.

Slanted surface 446D is formed on the right and left peripheries of the light-irradiation side of the holding frame 446 to which the spacer 449 is abutted.

A light-shielding film (not illustrated) is provided on the light-irradiation side of the holding frame 446 to prevent further reflection of the light reflected by the cross dichroic prism 444 again to the cross dichroic prism 444, thereby avoiding deterioration in contrast on account of stray light.

As shown in FIG. 10, crater-shaped concave portions 446E as adhesive receiver are formed on the accommodating portion 446A of the holding frame 446 in a dotted manner. Adhesive is dropped on the concave portion 446E and the liquid crystal panel 441 on which irradiation-side dustproof plate 441S and the incident-side dustproof plate 441N are fixed is fitted to the accommodating portion 446A so that the liquid crystal panel 441 is bonded and fixed in the holding frame 446.

The outer circumference of the irradiation-side dustproof plate 441S and the incident-side dustproof plate 441N is coated with heat-conductive silicone adhesive 441S1 and 441N1 so that the side of the accommodating portion 446A and the inner circumference of the opening 446C are bonded with the outer circumference of the irradiation-side dustproof plate 441S and the incident-side dustproof plate 441N.

Incidentally, the adhesive receiver provided on the accommodating portion 446A of the holding frame 446 may be a consecutive groove. The adhesive coated on the outer circumference of the irradiation-side dustproof plate 441S and the incident-side dustproof plate 441N may be solder or brazing filler metal instead of silicone adhesive.

As shown in FIG. 9, a heat-conductive plate 447 is attached on the light-incident side of the holding frame 446.

The heat-conductive plate 447 is a plate made of aluminum, which has an opening 447A corresponding to the opening 446C of the holding frame 446 and is closely attached and fixed to the light-incident side of the holding frame 446.

The heat-conductive plate 447 extends toward the lateral side along the light-incident side of the liquid crystal panel 441 accommodated in the holding frame 446 and a bent portion 447B bent toward the side of the liquid crystal panel 441 is provided on both sides of extension. The bent portion 447B is bent at a predetermined angle less than ninety degrees, which abuts to the walls 484B and 485B of the heat-conductive frames 484 and 485 and is bent approximately at ninety degrees when the optical device 44 is attached to a predetermined position of the lower light guide 48 as shown in FIG. 5.

Incidentally, though the heat-conductive plate 447 is made of aluminum, the heat-conductive plate 447 may be made of copper, magnesium and alloy containing copper and magnesium.

The polarization plate 443 is disposed between the respective liquid crystal panels 441R, 441G and 441B and the cross dichroic prism 444, which aligns the polarization direction of the color lights irradiated by the respective liquid crystal panels 441R, 441G and 441B. The polarization plate 443 is constructed by attaching a polarization film 443A as an optical conversion film approximately at the center of a sapphire plate 443B as a substrate.

The sapphire plate 443B of the polarization plate 443 has approximately the same width as the cross dichroic prism 444 with the bases 445 being fixed on top and bottom sides thereof, which is connected to the sides of the respective bases 445.

Though sapphire plate is used as the substrate, crystal, quartz glass or fluorite may be used.

The base 445 is fixed on both top and bottom sides of the cross dichroic prism 444 for fixing the optical device 44 to the light guide 47, which is made of aluminum having excellent heat-conductivity and has an outer profile approximately the same as the cross dichroic prism 444.

Though not specifically illustrated, positioning projection and fixing hole corresponding to the hole 482B6 on the bottom side 482B of the lower light guide 48 are formed on the bottom side of the base 445 located on the lower side of the cross dichroic prism 444 in order to mount the integrated optical device 44 to the light guide 47 by a screw etc.

Incidentally, though the base 445 is made of aluminum, the base may be made of material having excellent heat-conductivity such as magnesium alloy and copper, sapphire, crystal, fluorite or heat-conductive resin.

As shown in FIG. 9, the spacer 449 is interposed between the holding frame 446 and the sapphire plate 443B of the polarization plate 443 to adjust the position of the holding frame 446, which has approximately triangle cross section and is made of heat-insulative resin such as acryl and urethane.

Two spacers 449 are disposed on the respective holding frames 446 (total six), which abuts to the slanted surface 446D of the holding frame 446 and moves the holding frame 446 by the movement thereof to adjust the position of the respective liquid crystal panels 441R, 441G and 441B to the back-focus position of the projection lens 46. The details of the position adjustment will be described below.

[1-5. Production Process of Optical Device]

Production process of the optical device will be described below in detail with reference to FIGS. 8 to 10.

Initially, the prism unit is assembled according to the steps shown in the following (a) and (b).

(a) The bases 445 are bonded on the top and bottom sides of the cross dichroic prism 444 using heat-curing adhesive having excellent heat-conductivity.

(b) The polarization plate 443 is bonded on the light-incident side of the cross dichroic prism 444 while being in contact with the top and bottom bases 445 using heat-curing adhesive or light-curing adhesive having excellent heat-conductivity.

Next, the optical modulator 440 is assembled and is attached to the prism unit according to the step shown in following (c).

(c) After filling the concave portion 446E of the holding frame 446 with heat-conductive adhesive, the liquid crystal panel 441 on which the irradiation-side dustproof plate 441S and the incident-side dustproof plate 441N is fixed is fitted to the accommodating portion 446A to be bonded. At this time, the irradiation-side dustproof plate 441S and the incident-side dustproof plate 441N is simultaneously bonded to the sides of the accommodating portion 446A and the inner circumference of the opening 446C by the silicone adhesive 441S1 and 441N1 coated on the outer circumference thereof.

Next, the position of the liquid crystal panel 441 is adjusted according to the step described in the following (d).

(d) The spacer 449 coated with light-curing adhesive is inserted between the slanted surface 446D of the holding frame 446 and the sapphire plate 443B of the polarization plate 443 and the spacer 449 is moved along the slanted surface 446D to adjust the position of the holding frame 446 at the back-focus position of the projection lens 46. Specific position adjusting process will be described below.

(e) Subsequently, the adhesive are cured to fix the respective components and the heat-conductive plate 447 is bonded on the light-incident side of the holding frame 446.

The optical device is produced according to the above steps.

The spacer 449 is moved using surface tension of the light-curing adhesive coated on the surface of the spacer 449. The holding frame 446, the sapphire plate 443B of the polarization plate 443 and the spacer 449 are fixed by, for instance, temporarily fixing the components with light-curing adhesive in spots and filling heat-conductive adhesive into the gap between the holding frame 446 and the sapphire plate 443B to be finally fixed. The position adjustment includes both of focus and alignment adjustment.

Incidentally, the respective liquid crystal panels 441R, 441G and 441B may not be attached to the cross dichroic prism 444 in accordance with the above specific steps, but may be attached in any sequence as long as the condition shown in FIG. 8 can be finally obtained. The liquid crystal panels 441R, 4410 and 441B integrated as in the above are fixed by a screw etc. after inserting positioning projection formed on the bottom side of the base 445 located on the lower side of the cross dichroic prism 444 to the holes 482B6 (FIG. 6) formed on the bottom side 482B of the lower light guide 48 to adjust the position thereof.

[1-6. Position Adjusting Process of Liquid Crystal Panel]

The three-dimensional position of the liquid crystal panels 441R, 441G and 441B to the cross dichroic prism 444 during the position adjusting step (d) is adjusted while the spacer 449 with light-curing adhesive coated thereon is inserted between the slanted surface 446D of the holding frame 446 and the sapphire plate 443B of the polarization plate 443 before the adhesive is cured, as follows.

Initially, the alignment of the liquid crystal panel 441G opposing to the projection lens 46 is adjusted using the connection surface between the sapphire plate 443B and the spacer 449 as the slide surface, and the connecting portion between the holding frame 446 and the spacer 449, i.e. the spacer 449, is moved along the slanted surface 446D of the holding frame 446 to adjust the focus of the liquid crystal panel. After adjusting the position of the liquid crystal panel 441G at a predetermined position relative to the projection lens 46, ultraviolet is irradiated on the light-curing adhesive to cure the adhesive and fix the liquid crystal panel. The ultraviolet transmits through the spacer 449 to be irradiated onto the light-curing adhesive to cure the light-curing adhesive.

Subsequently, using the position-adjusted and fixed liquid crystal panel 441G as a reference, the position of the liquid crystal panels 441R and 441B is adjusted and fixed in the same manner as the above.

[1-7. Cooling Mechanism by Cooling Unit]

Figure 12:
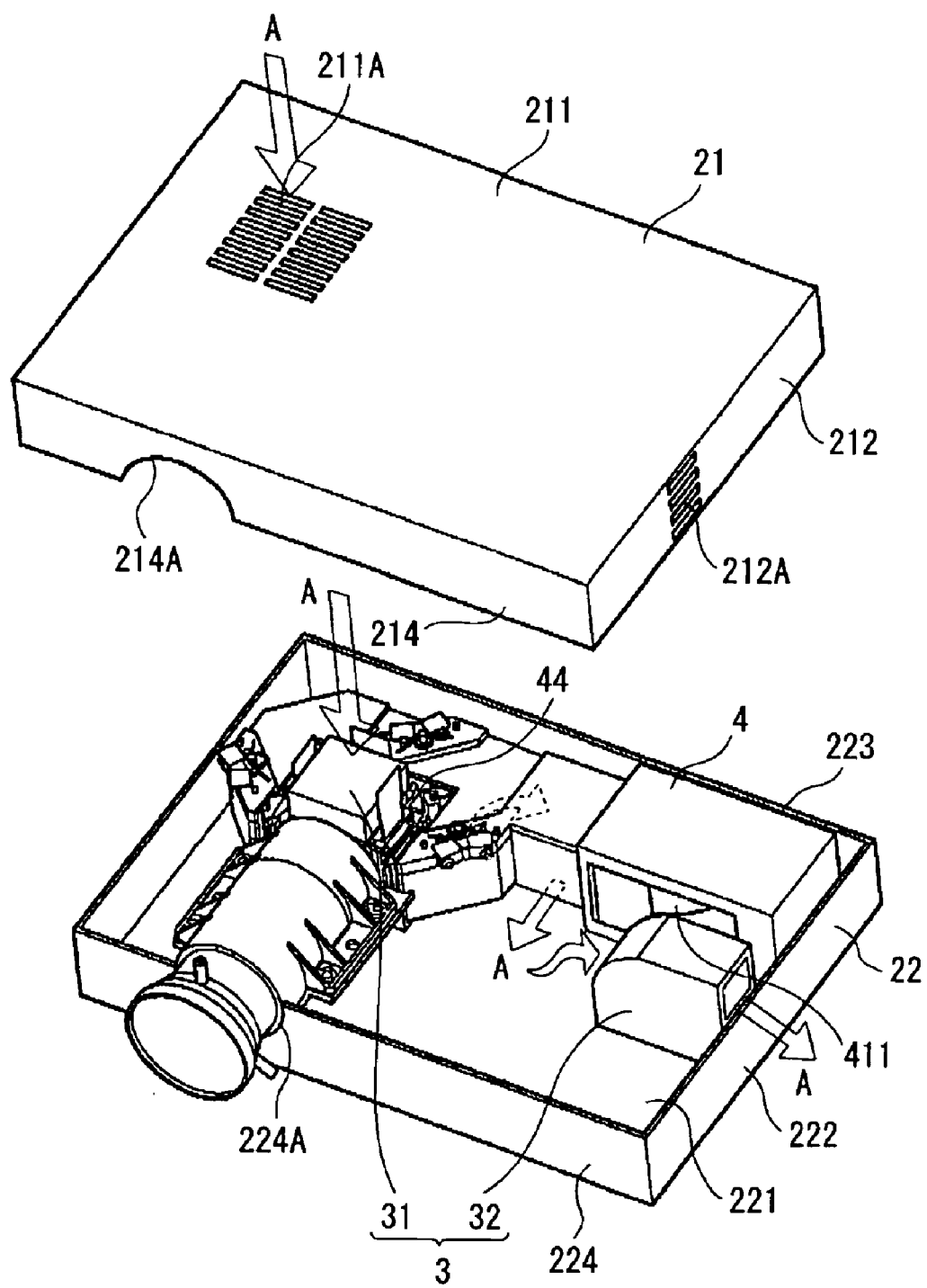
FIG. 12 is an exploded perspective view showing a cooling channel of a panel cooling system A of the aforesaid embodiment.
Figure 13:
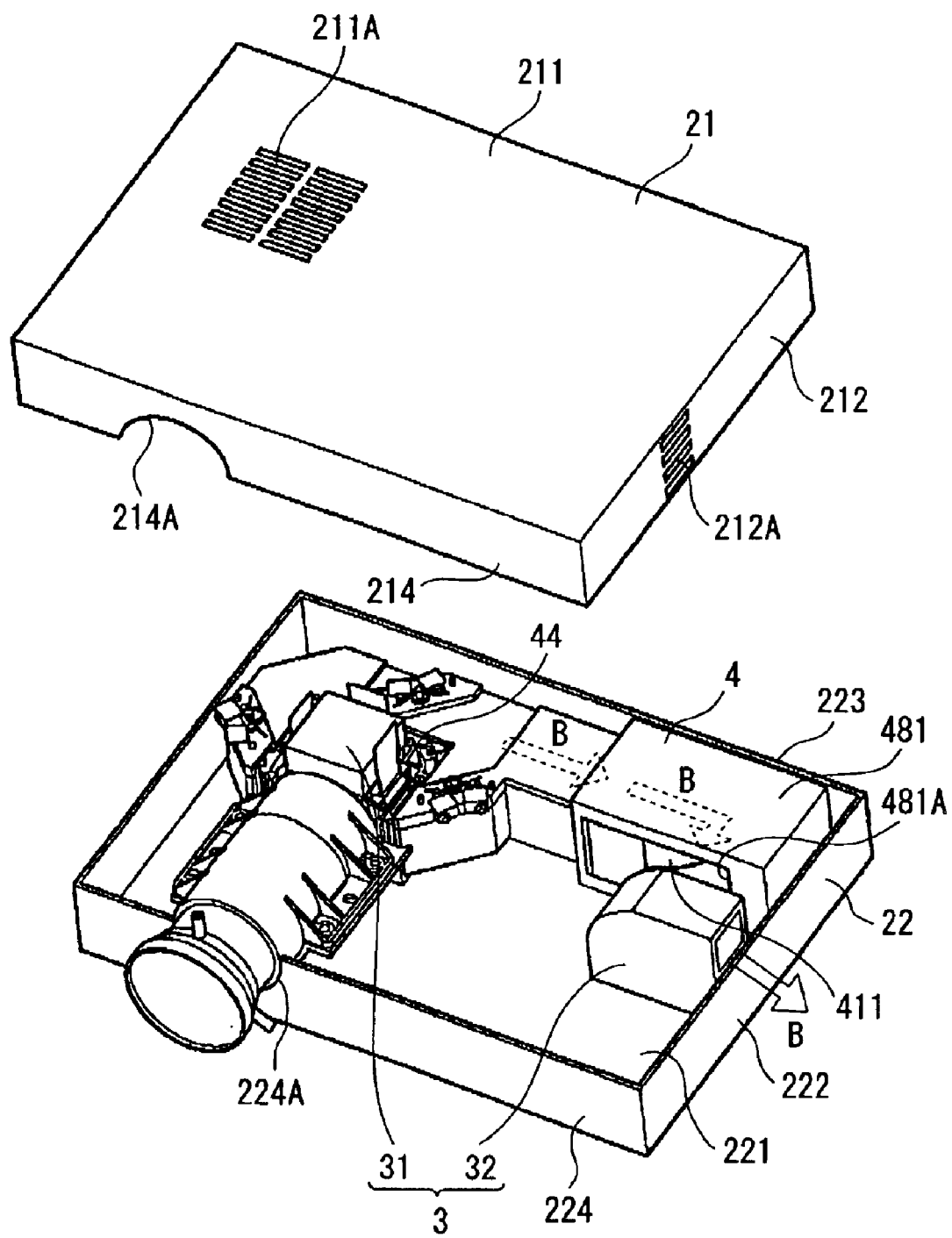
FIG. 13 is an exploded perspective view showing a cooling channel of a light source cooling system B of the aforesaid embodiment.
Figure 14:
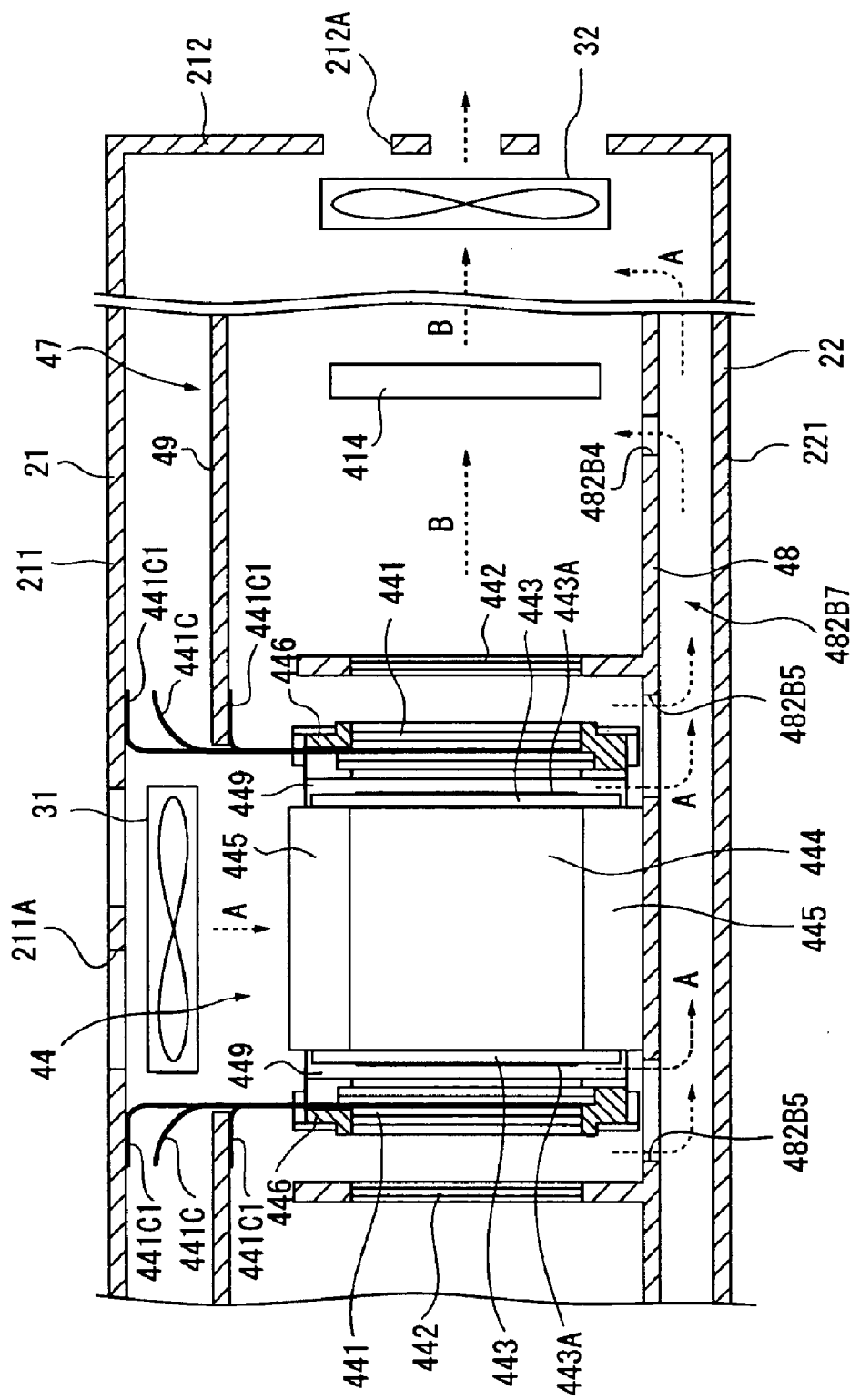
FIG. 14 is a cross section showing the cooling channel of the panel cooling system A and thee light source cooling system B of the aforesaid embodiment.

FIG. 12 is an illustration showing a cooling channel of a panel cooling system A. FIG. 13 is an illustration showing a cooling channel of a light source cooling system B. FIG. 14 is a cross section showing the cooling channels of the panel cooling system A and the light source cooling system B.

The projector 1 according to the present embodiment has the panel cooling system A mainly for cooling the optical device 44 and the light source cooling system B mainly for cooling the light source 411.

As shown in FIG. 12, the panel cooling system A uses the axial-flow intake fan 31 provided above the optical device 44. The axial-flow intake fan 31 draws in a cooling air from the intake port 211A formed on the upper side 211 of the upper case 21, which is introduced to the upper side of the optical device 44. Since the upper light guide 49 is provided on the upper side of the lower light guide 48 so that the upper side of the optical device 44 is exposed, the cooling air drawn in by the axial-flow intake fan 31 can be taken into the inside of the light guide 47.

As shown in FIG. 14, the cooling air taken into the light guide 47 cools the upper side of the base 445 and enters into the gap between the polarization plate 443 formed by the spacer 449 and the holding frame 446 or to the light-incident side of the holding frame 446 to cool the light-irradiation side and light-incident side of the respective liquid crystal panels 441R, 441G and 441B, the holding frame 446, the polarization plates 442 and 443 and the polarization film 443A on the surface of the polarization plate 443, and passes the exhaust port 482B5 formed on the bottom side 482B of the lower light guide 48 to be discharged to the outside of the light guide 47.

The air which passes through the exhaust port 482B5 formed on the bottom side 482B of the lower light guide 48 is introduced to the duct 482B7 formed when the lower light guide 48 abuts to the bottom side 221 of the lower case 22, and is sent to the front side of the optical unit 4.

As shown in FIG. 12, the air having cooled the optical device 44 and sent to the front side of the optical unit 4 through the duct 482B7 is drawn by the sirocco fan 32 disposed around the light source 411 and is discharged through the exhaust port 212A formed on the lateral side 212 of the upper case 21.

The cooling air of the panel cooling system A not only cools the optical device 44 but also blows off the dust etc. adhered on the panel surface by being blown on the surface of the liquid crystal panels 441R, 441G and 441B. The surface of the liquid crystal panels 441R, 441G and 441B can be always made clean by the panel cooling system A, an optical image of stable image quality can be projected on the screen by the projector 1.

As shown in FIG. 13, the light source cooling system B uses the sirocco fan 32 provided around the light source 411.

The intake port of the sirocco fan 32 opposes to the rectangular gap formed by the opening 481A on the lateral side of the light source accommodating portion 481 of the lower light guide 48 and the fixing plate 411B for mounting the light source 411.

As shown in FIGS. 13 and 14, the cooling air entered into the inside of the light guide 47 by the panel cooling system A not only cools the optical device 44 to be discharged to the outside of the light guide 47 through the exhaust port 482B5 formed on the bottom side 482B of the lower light guide 48, but also drawn to the backside of the light source 411 through the inside of the light guide 47 and the intake port 482B4 by the sirocco fan 32.

While being drawn by the sirocco fan 32, the cooling air passes through the space between the integrated first lens array 412, the second lens array 413 and the polarization converting optical element 414 to cool the components and, subsequently enters into the light source 411 to cool the light source lamp 416 and the ellipsoidal mirror 417.

At this time, since great amount of heat is generated on the polarization converting optical element 414 on account of the light beam irradiated by the light source lamp 416, cooling process of the polarization converting optical element 414 is effective for stably working and improving the durability of the optical unit 4 and improvement.

The air having cooled the polarization converting optical element 414 and the light source 411 passes through the rectangular gap formed by the opening 481 on the lateral side of the light source accommodating portion 481 of the lower light guide 48 and the fixing plate 411B for mounting the light source 411 to be drawn by the sirocco fan 32 and be discharged through the exhaust port 212A formed on the lateral side 212 of the upper case 21.

[1-8. Heat-radiation Mechanism of Optical Device]

In the projector 1 of the present embodiment, the cooling channel of the optical device 44 is not only defined by forcible cooling mechanism using the cooling fan but also by the structure of the optical device itself.

Heat-radiation channel of the optical device 44 will be described below with reference to FIGS. 5, 9, 10 and 14.

Heat is generated on the liquid crystal panels 441R, 441G and 441B of the optical device 44 and the polarization film 443A on the light-irradiation side by irradiating the light beam from the light source 411.

Since the mutual heat transfer between the holding frame 446 accommodating the liquid crystal panel 441 and the polarization plate 443 constructed by attaching the polarization film 443A on the sapphire plate 443B is separated by the spacer 449 made of heat-insulative resin etc., the heat-radiation channel for the heat generated on the liquid crystal panels 441R, 441G and 441B and the polarization film 443A is divided, which will be described below.

Initially, the heat-radiation channel of the liquid crystal panels 441R, 441G and 441B will be described.

The liquid crystal panel 441 is connected with the irradiation-side and the incident-side dustproof plates 441S and 441N and the control cable 441C with the heat-conductive coating 441C1 formed thereon, so that the heat generated on the liquid crystal panel 441 is separately transferred to the irradiation-side and the incident-side dustproof plate 441S and 441N and the heat-conductive coating 441C1.

The irradiation-side and the incident-side dustproof plates 441S and 441N touch the air inside the light guide 47 and are connected with the holding frame 446 for the liquid crystal panel 441 to be held, so that the heat is transferred to the holding frame 446 while heat-exchanging with the cooling air by the panel cooling system A.

The heat-conductive coating 441C1 touches the air inside the light guide 47 and is connected with the upper light guide 49 and the upper side 211 of the upper case 21 as shown in FIG. 14, so that the heat is transferred to the light guide 47 and the exterior case 2 while heat-exchanging with the cooling air by the panel cooling system A.

The holding frame 446 touches the air inside the light guide 47 and is connected with the heat-conductive plate 447 fixed on the light-incident side of the holding frame 446, so that the heat transferred to the holding frame 446 is transferred to the heat-conductive plate 447 while heat-exchanging with the cooling air by the panel cooling system A.

The heat-conductive plate 447 touches the air inside the light guide 47 and is connected with the walls 484B and 485B of the heat-conductive frames 484 and 485 attached to the lower light guide 48, so that the heat transferred to the heat-conductive plate 447 is radiated to the heat-conductive frames 484 and 485 while heat-exchanging with the cooling air by the panel cooling system A.

At this time, though the heat-conductive plate 447 is thermally expanded by the transferred heat so that the extension end of the heat-conductive plate 447 moves toward the heat-conductive frames 484 and 485, the heat-conductive frame 484 advances and retracts along the bottom side 482B of the lower light guide 48 to absorb the deformation of the heat-conductive plate 447 on account of heat expansion. Accordingly, the difference in the heat expansion of the heat-conductive plate 447 on account of dispersion in the heat generated on the liquid crystal panels 441R, 441G and 441B is absorbed by the movement of the heat-conductive frame 484, thus restraining uneven stress on the heat-conductive plate 447.

The heat-conductive frames 484 and 485 touche the air inside the light guide 47 and are connected with the bottom side 482B of the lower light guide 48 through the attachment portions 484A and 485A of the heat-conductive frames 484 and 485, so that the heat transferred to the heat-conductive frames 484 and 485 is transferred to the light guide 47 while heat-exchanging with the cooling air by the panel cooling system A.

The light guide 47 touches the air inside the projector 1, so that the heat transferred to the light guide 47 is heat-exchanged with the air inside the projector 1, which is discharged to the outside by the sirocco fan 32.

Next, the heat-radiation channel of the polarization film 443A will be described.

The polarization film 443A touches the air inside the light guide 47 in the same manner as the liquid crystal panel 441 and is connected with the sapphire plate 443B of the polarization plate 443, so that the heat generated on the polarization film 443A is transferred to the sapphire plate 443B while heat-exchanging with the cooling air by the panel cooling system A.

The sapphire plate 443B touches the air inside the light guide 47 and is connected with the base 445 fixed on the top and bottom sides of the cross dichroic prism 444, so that the heat transferred on the sapphire plate 443B is transferred to the top and bottom bases 445 while heat-exchanging with the cooling air by the panel cooling system A.

The base 445 fixed on the top of the cross dichroic prism 444 touches the air inside the light guide 47, so that the heat transferred to the upper base 445 is heat-exchanged with the cooling air by the panel cooling system A.

The base fixed on the bottom side of the cross dichroic prism 444 is connected with the bottom side 482B of the lower light guide 48, so that the heat transferred to the base 445 fixed on the bottom side of the prism is transferred to the light guide 47.

The light guide 47 touches the air inside the projector 1, so that the heat transferred to the light guide 47 is heat-exchanged with the air inside the projector 1 to be discharged to the outside by the sirocco fan 32.

As described above, the optical device 44 is cooled by connection of the respective components of the optical device 44 and the cooling unit 3.

[1-9. Advantages of First Embodiment]

According to the above-described embodiment, following advantages can be obtained.

(1) Since the optical device 44 has the liquid crystal panels 441R, 441G and 441B and the polarization film 443A and the liquid crystal panels 441R, 441G and 441B are attached to the cross dichroic prism 444 through the position-adjusting spacer 449 made of heat-insulative material, the heat generated on the liquid crystal panels 441R, 441G and 441B and the polarization film 443A by the light beam irradiated by the light source is blocked by the heat-insulative spacer 449, so that conduction of the heat from the high-temperature side to the low-temperature side between the liquid crystal panels 441R, 441G and 441B and the polarization film 443A can be prevented, thereby enhancing the cooling efficiency of the optical device 44.

(2) Since the polarization film 443A is connected to the base 445 of the cross dichroic prism 444 through the sapphire plate 443B and the liquid crystal panels 441R, 441G and 441B are connected to the light guide 47 through the heat-conductive coating 441C1, or the holding frame 446, the heat-conductive plate 447 and the heat-conductive frames 484 and 485, the heat on the polarization film 443A and the liquid crystal panels 441R, 441G and 441B of which heat channel is divided by the spacer 449 made of heat-insulative material can be separately transferred to the base 445 and the light guide 47, thereby securely cooling the polarization film 443A and the liquid crystal panels 441R, 441G and 441B without causing heat conduction.

(3) Since the sapphire plate 443B having great rigidity is used as the substrate of the polarization plate 443, the sapphire plate 443B can be used as the light-irradiation side polarization plate 443 by attaching the polarization film 443A approximately at the center of the sapphire plate 443B, and since the sapphire plate 443B is connected to the top and bottom bases 445, extra components can be omitted, thereby reducing production cost.

(4) Since the optical modulator 440 has the holding frame 446 and the holding frame 446 is constructed by heat-conductive resin containing carbon, titanium, aluminum, silicon fluoride and so on, the linear expansion coefficient of the holding frame 446 can be approximated to glass material. In other words, the linear expansion coefficient of the holding frame 446 can be made close to the linear expansion coefficient of the drive substrate 441D and the opposing substrate 441E of the liquid crystal panels 441R, 441G and 441B, so that the deformation on account of thermal deformation of the liquid crystal panels 441R, 441G and 441B and the holding frame 446 caused by irradiating light beam from the light source 411 can be made approximately the same level.

Accordingly, thermal stress generated by the difference in the linear expansion coefficient can be mitigated and the shift in the relative position of the liquid crystal panels 441R, 441G and 441B can be prevented, thus avoiding picture element shift of the displayed image and damage on the liquid crystal panels 441R, 441G and 441B on account of thermal stress.

(5) Since the outer circumference of the irradiation-side dustproof plate 441S and the incident-side dustproof plate 441N attached on the surface of the liquid crystal panels 441R, 441G and 441B is connected with the holding frame by the heat-conductive silicone adhesive 441S1 and 441N1, the heat transferred from the liquid crystal panels 441R, 441G and 441B to the irradiation-side dustproof plate 441S and the incident-side dustproof plate 441N can be securely transferred to the holding frame 446. Further, the silicone adhesive 441S1 and 441N1 coated on the outer circumference of the irradiation-side dustproof plate 441S and the incident-side dustproof plate 441N prevents the leakage of a part of the light transmitted through the irradiation-side dustproof plate 441S and the incident-side dustproof plate 441N from the outer circumference of the irradiation-side dustproof plate 441S and the incident-side dustproof plate 441N by reflection or refraction, thereby improving the optical quality of the optical device 44.

(6) Since the heat-conductive coating 441C1 is provided on the control cable 441C of the liquid crystal panels 441R, 441G and 441B, the heat generated on the liquid crystal panels 441R, 441G and 441B can be radiated through the heat-conductive coating 441C1, thereby further enhancing the cooling efficiency of the liquid crystal panels 441R, 441G and 441B.

(7) Since the heat-conductive coating 441C1 of the control cable 441C of the liquid crystal panels 441R, 441G and 441B is connected to the light guide 47 and the upper case 21, the heat generated on the liquid crystal panels 441R, 441G and 441B can be transferred to the light guide 47 and the upper case 21 having greater heat capacity, so that the cooling efficiency of the liquid crystal panels 441R, 441G and 441B can be further enhanced.

(8) Since the spacer 449 is provided on the optical device 44, the position of the liquid crystal panels 441R, 441G and 441B can be adjusted by moving the position of the spacer 449 to adjust the picture element of the projected image or the back-focus position from the projection lens, so that the position of the liquid crystal panels 441R, 441G and 441B can be appropriately located.

(9) Since the spacer 449 is made of ultraviolet-transmitting resin such as acryl and urethane, when the sapphire plate 443B is attached to the holding frame 446 accommodating the liquid crystal panels 441R, 441G and 441B in manufacturing the optical device 44, light transmits through the spacer 449 coated with light-curing adhesive, so that the holding frame 446 can be easily connected to the sapphire plate 443B, thereby improving the production efficiency of the optical device 44.

(10) Since the bent portion 447B bent at a predetermined angle less than ninety degrees is formed on the end of the extension of the heat-conductive plate 447 and the bent portion 447B abuts to the walls 484B and 485B of the heat-conductive frames 484 and 485 while the bent portion 447B being biased to bring the bent portion 447B of the heat-conductive plate 447 in close contact with the walls 484B and 485B, thus securing heat channel for transferring heat to the light guide 47 and securely cooling the liquid crystal panels 441R, 441G and 441B.

(11) Since the heat-conductive plate 447 is made of material having excellent heat-conductivity such as aluminum, the heat generated on the respective liquid crystal panels 441R, 441G and 441B can be securely radiated and the resilience of the heat-conductive plate can be lessened, thereby reducing uneven stress generated during thermal expansion to prevent picture element shift of the liquid crystal panels 441R, 441G and 441B.

(12) The liquid crystal panel 441 can be closely adhered on the holding frame 446 by bonding and fixing the liquid crystal panel 441 to the holding frame 446 by the adhesive filled in the concave portion 446E as the adhesive receiver of the holding frame 446, and air bubble is not likely to be mixed in the adhesive by configuring the adhesive receiver as the crater-shaped concave portion 446E, thereby securely transferring the heat of the liquid crystal panels 441R, 441G and 441B to the holding frame 446. Further, since the liquid crystal panel 441 is directly bonded to the holding frame 446, component such as support plate normally required for sandwiching and holding the liquid crystal panel together with the holding frame 446 can be omitted, thus reducing the number of components.

(13) Since the heat generated on the liquid crystal panels 441R, 441G and 441B and the polarization film 443A can be radiated by the forcible cooling by the panel cooling system A, natural air-cooling by the air inside the projector 1 and heat transfer to the components of the optical device 44 and the light guide 47, the cooling efficiency of the liquid crystal panels 441R, 441G and 441B and the polarization film 443A can be further enhanced.

(14) Since the above cooling mechanism is used, the number of the cooling fan can be reduced and rotation speed of the cooling fan can be reduced to allow weak cooling air flow, thereby reducing noise and size of the projector 1.

[2, Second Embodiment]

A projector according to a second embodiment of the present invention will be described below.

The projector according to the second embodiment differs to the projector 1 of the first embodiment only in the arrangement for connecting the heat-conductive plate 447 fixed to the holding frame 447 accommodating the liquid crystal panels 441R, 441G and 441B with the heat-conductive frames 484 and 485 attached to the lower light guide 48. Accordingly, the same reference numerals will be attached to the components identical with or corresponding to those of the first embodiment to omit or simplify the description thereof.

[2-1. Structure of Optical Device]

Figure 15:
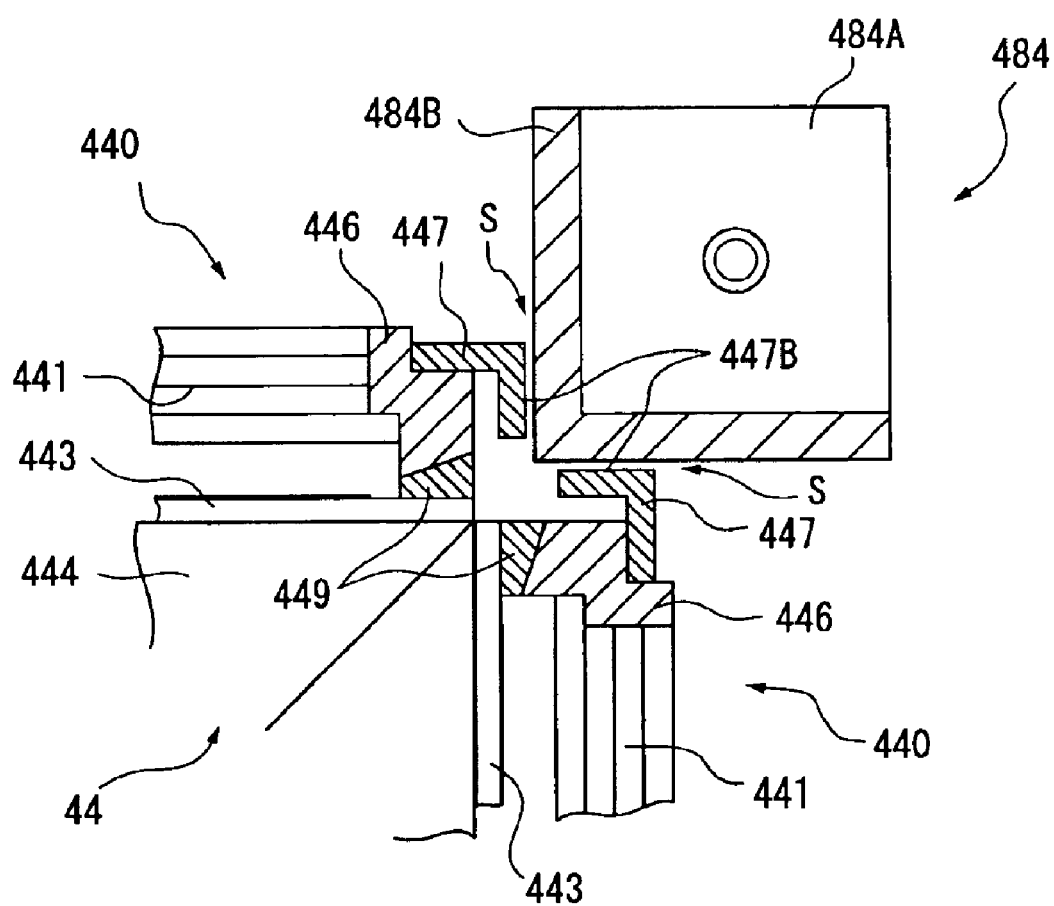
FIG. 15 is a cross section showing connecting structure of an optical device and a heat-conductive frame of a second embodiment of the present invention.
Figure 16:
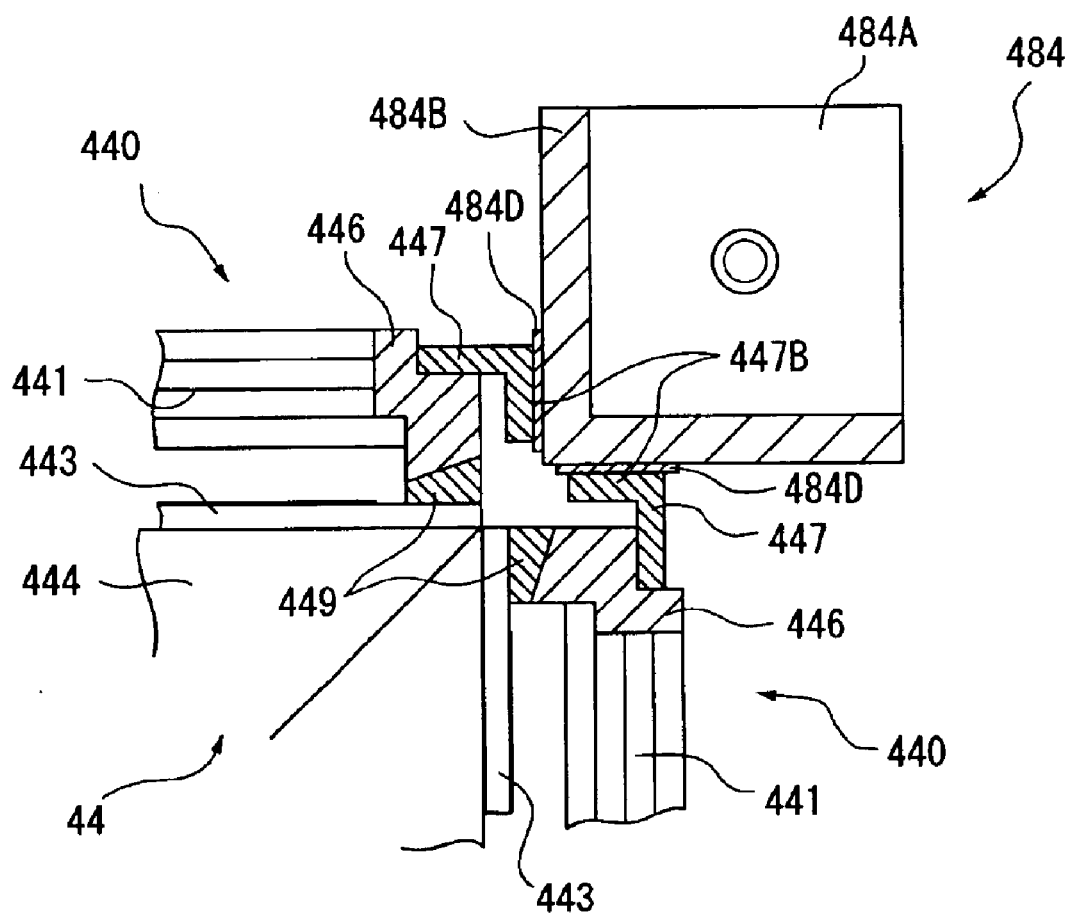
FIG. 16 is a cross section showing another connecting structure of the optical device and the heat-conductive frame of the aforesaid embodiment different from FIG. 15.
Figure 17:
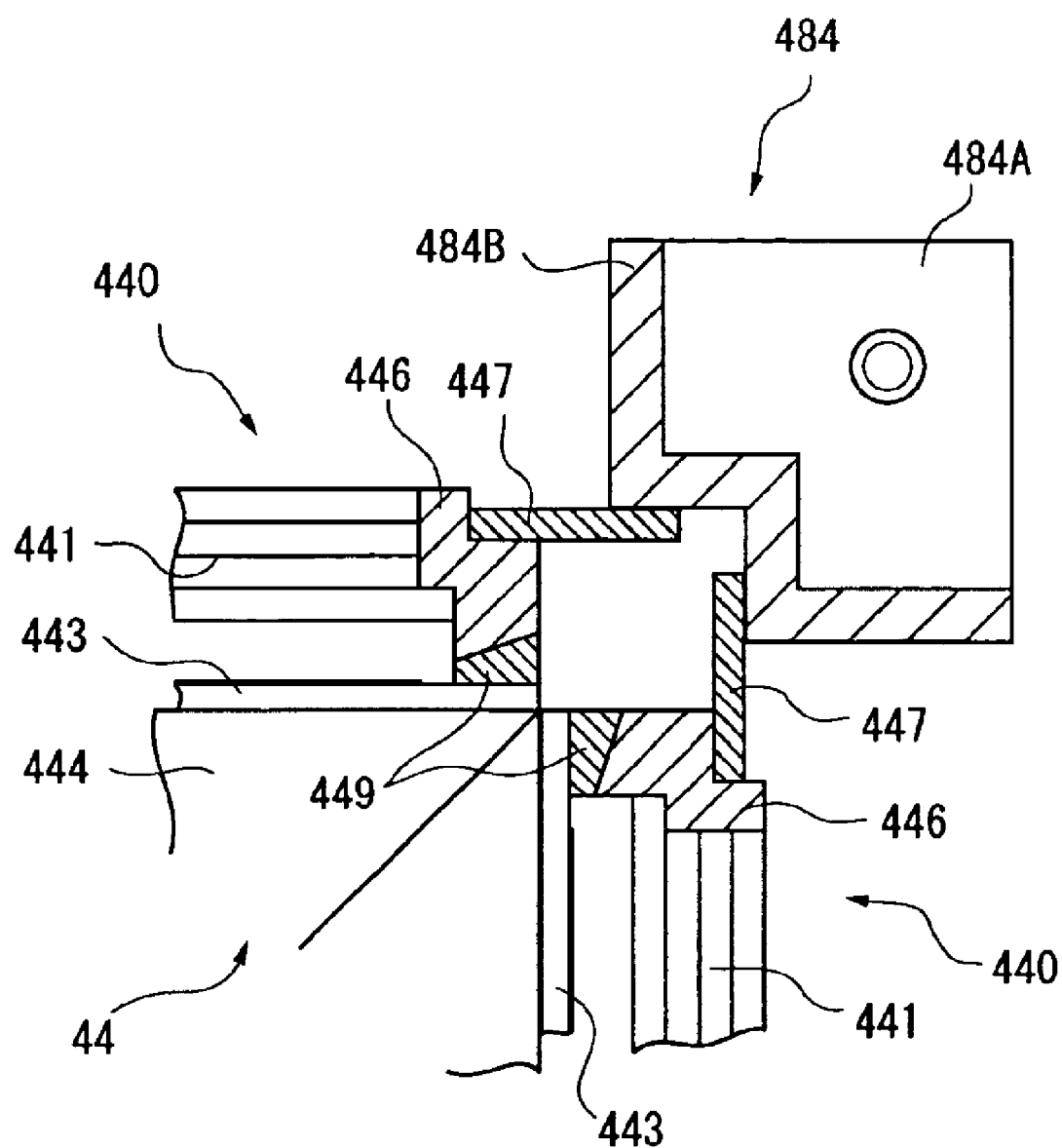
FIG. 17 is a cross section showing still another connecting structure of the optical device and the heat-conductive frame of the aforesaid embodiment different from FIGS. 15 and 16.

FIGS. 15 to 17 are cross sections showing primary portions of the optical device 44 and the heat-conductive frame 484, which respectively show different arrangements for connecting the heat-conductive plate 447 and the heat-conductive frame 484.

As shown in FIGS. 15 to 17, the optical device 44 has the liquid crystal panels 441R, 441G and 441B, the holding frame 446, the polarization plate 443, the cross dichroic prism 44 and the spacer 449, which are the same components as those of the first embodiment.

A heat-conductive plate 447 connected with heat-conductive frame 484 attached in an advanceable and retractable manner along the bottom side 482B of the lower light guide 48 is fixed on the holding frame 446.

The arrangement for connecting the heat-conductive plate 447 with the heat-conductive frame 484 shown in FIGS. 15 to 17 will be described below.

In FIG. 15, the heat-conductive plate 447 horizontally extends along the light-incident side of the liquid crystal panels 441R, 441G and 441B and the bent portion 447B bent by approximately ninety degrees is formed on the end of the extension. The bent portion 447B and the wall 484B of the heat-conductive frame 484 are opposed with a gap S therebetween.

Specifically, when the light beam from the light source is not irradiated onto the liquid crystal panels 441R, 441G and 441B (room temperature condition), the heat-conductive plate 447 is not connected with the wall 484B of the heat-conductive frame 484, and the bent portion 447B of the heat-conductive plate 447 is connected with the wall 484B of the heat-conductive frame 484 when the heat-conductive plate 447 is thermally expanded by the heat generated by irradiating light beam to the liquid crystal panels 441R, 441G and 441B.

As shown in FIG. 16, the bent portion 447B of the heat-conductive plate 447 may be connected with the wall 484B of the heat-conductive frame 484 through an elastic member 484D made of heat-conductive material.

The elastic member 484D is constructed by bonding a plate member to the wall 484B of the heat-conductive frame 484, which has a thickness corresponding to the movement amount of the bent portion 447B toward the wall 484B when the heat-conductive plate 447 is thermally expanded by the heat generated by irradiating the light beam onto the liquid crystal panels 441R, 441G and 441B.

As shown in FIG. 17, the heat-conductive plate 447 planarly extends along the light-incident side of the liquid crystal panels 441R, 441G and 441B and a part of the wall 484B of the heat-conductive frame 484 has wall surface along the extension of the heat-conductive plate 447, where the distal end of the extension of the heat-conductive plate 447 is connected to the wall surface.

Specifically, the distal end of the heat-conductive plate 447 is slidably connected with the wall 484B when the heat-conductive plate 447 is thermally expanded along the extending direction by the heat generated by irradiating the light beam on the liquid crystal panels 441R, 441G and 441B.

Incidentally, though the heat-conductive frames 484 and 485 are attached along the bottom side 482B of the lower light guide 48 in an advanceable and retractable manner in the above-described second embodiment, the heat-conductive frames may be fixed on the bottom side 482B or may be integrated with the lower light guide 48 as a wall body projecting on the bottom side 482B.

[2-2. Advantage of Second Embodiment]

According to the present embodiment, following advantages can be obtained as well as the advantages approximately identical with (1) to (9) and (11) to (14) of the first embodiment.

(15) Since the gap S is provided between the bent portion 447B formed on the extension end of the heat-conductive plate 447 and the wall 484B of the heat-conductive frame 484 at the room temperature condition, no pressure is applied to the heat-conductive plate 447, so that the picture element shift of the liquid crystal panels 441R, 441G and 441B can be prevented. Further, since the bent portion 447B abuts to the wall 484B on the heat-conductive plate 447 is thermally expanded, the heat generated on the liquid crystal panels 441R, 441G and 441B can be transferred to the light guide 47 through the heat-conductive frame 484, thereby securely cooling the liquid crystal panels 441R, 441G and 441B.

(16) Since the elastic member 484D made of heat-conductive material is provided between the bent portion 447B of the heat-conductive plate 447 and the wall 484B of the heat-conductive frame 484, the pressure applied on the heat-conductive plate 447 is absorbed by the elastic member 484D to prevent position shift of the picture element of the liquid crystal panels 441R, 441G and 441B and the heat generated on the liquid crystal panels 441R, 441G and 441B can be securely transferred to the light guide 47, thereby cooling the liquid crystal panels 441R, 441G and 441B.

(17) Since the distal end of the extension of the heat-conductive plate 447 is connected with the wall 484B of the heat-conductive frame 484 in a slidable manner in the extending direction, the movement in extending direction of the distal end of the heat-conductive plate 447 thermally expanded by the heat of the liquid crystal panels 441R, 441G and 441B is not restricted and no pressure is applied to the heat-conductive plate 447, thereby preventing position shift of the picture element of the liquid crystal panels 441R, 441G and 441B. Further, since the connection between the heat-conductive plate 447 and the wall 484B is maintained, the heat can be transferred to the light guide 47, thereby securely cooling the liquid crystal panels 441R, 441G and 441B.

[3. Third Embodiment]

A projector according to third embodiment of the present invention will be described below.

The projector according to the third embodiment of the present embodiment differs to the projector 1 of the first and the second embodiments only in the bonding arrangement for accommodating and fixing the liquid crystal panels 441R, 441G and 441B of the optical modulator 440 to the holding frame 446. Accordingly, the same reference numeral will be attached to the components identical with or corresponding to those of the first and the second components to omit or simplify the description thereof.

[3-1. Structure of Optical Modulator]

Figure 18:
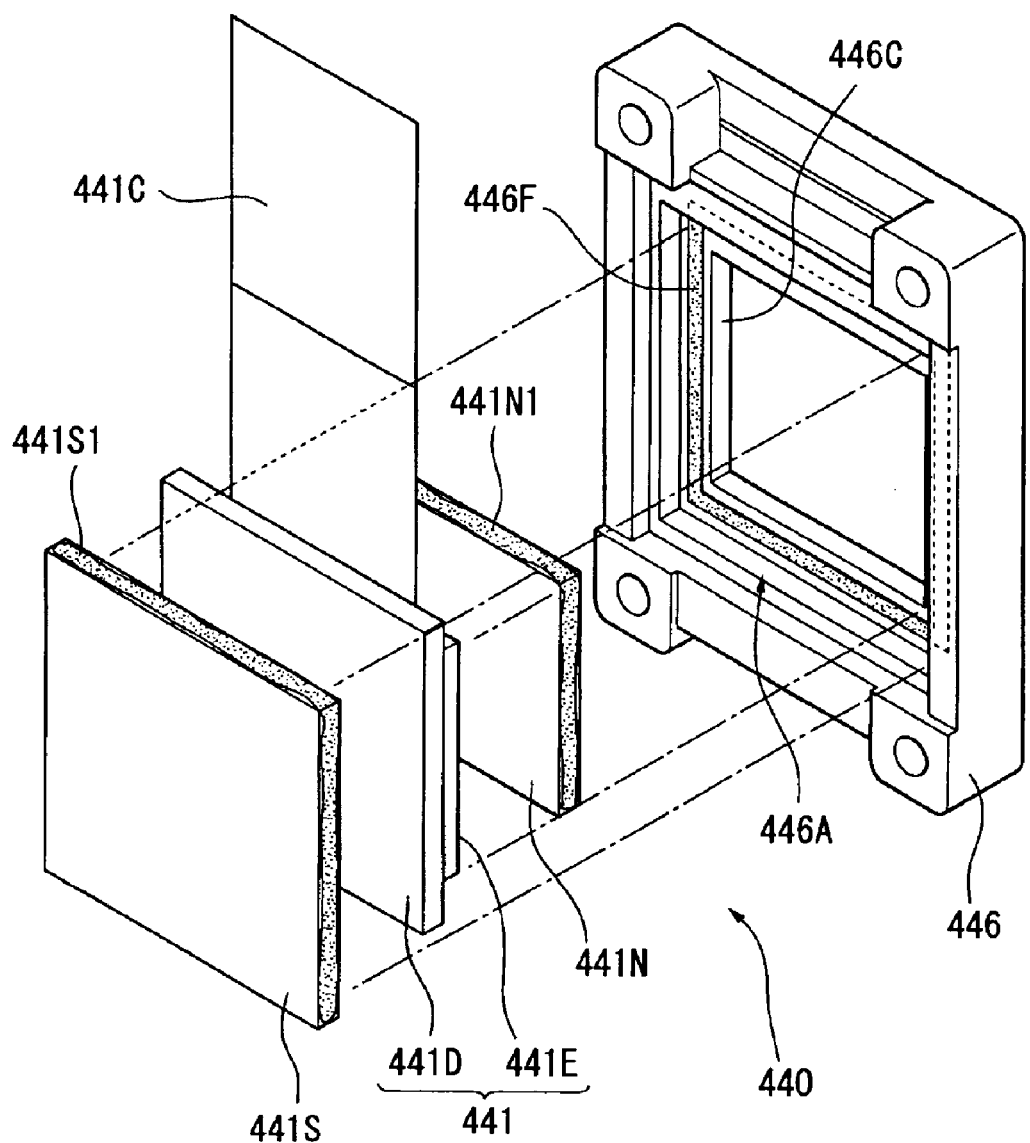
FIG. 18 is an exploded perspective view showing a structure of a liquid crystal panel of a third embodiment of the present invention.

FIG. 18 is an exploded perspective view of the optical modulator 440.

As shown in FIG. 18, the optical modulator 440 has the liquid crystal panel 441 identical with that of the first embodiment including the drive substrate 441D and the opposing substrate 441E, the irradiation-side dustproof plate 441S and the incident-side dustproof plate 441N fixed on the surface of the liquid crystal panel 441, and the holding frame 446 for accommodating the liquid crystal panel 441.

A frame-shaped silicone rubber sheet 446F is attached to the accommodating portion 446A of the holding frame 446 surrounding the periphery of the opening 446C. The silicone rubber sheet 446F is located at a position to be in close contact with the irradiation-side dustproof plate 441S or the incident-side dustproof plate 441N when the liquid crystal panel 441 is bonded to the holding frame 446.

Incidentally, the frame-shaped silicone rubber may not be silicone rubber sheet but may be formed by dichroic molding or baking. The silicone rubber may not be provided on the holding frame 446, but may be provided on the irradiation-side dustproof plate 441S or the incident-side dustproof plate 441N, or may be provided on both of the holding frame 446 and the irradiation-side dustproof plate 441S or the incident-side dustproof plate 441N.

[3-2. Advantages of Third Embodiment]

According to the present embodiment, following advantage can be obtained as well as the advantages approximately identical with the advantages (1) to (11) and (13) to (17).

(18) Since the silicone rubber sheet 446F is interposed between the holding frame 446 and the irradiation-side dustproof plate 441S or the incident-side dustproof plate 441N, the holding frame 446 can be more closely attached to the irradiation-side dustproof plate 441S or the incident-side dustproof plate 441N, so that the heat-conductivity in trasnferring the heat generated on the liquid crystal panel 441 to the holding frame 446 can be enhanced.

[4. Modification of Embodiments]

Incidentally, the scope of the present invention is not restricted to the above embodiments but includes following modifications.

Though the cooling unit 3 includes the axial-flow intake fan 31, the axial-flow intake fan 31 being disposed above the optical device 44 so that the cooling air flows from the upper side of the optical device 44 to the lower side thereof, the axial-flow intake fan 31 may be disposed on the lower side of the optical device 44 so that the cooling air flows from the lower side to the upper side of the optical device 44.

Heat-conductive member such as stretchable spring silicone rubber may be interposed between the base 44C fixed on the top side of the cross dichroic prism 444 and the heat-conductive frames 484 and 485, and the upper light guide 49 or the upper case 21.

According to the above arrangement, the heat generated on the liquid crystal panels 441R, 441G and 441B and the polarization film 443A by the light beam irradiated by the light source 411 is transferred to the base 445 and the heat-conductive frames 484 and 485 and subsequently is transferred to the upper light guide 49 or the upper case 21 from the base 445 and the heat-conductive frames 484 and 485 through the spring silicone rubber, total heat capacity capable of being released from the liquid crystal panels 441R, 441G and 441B and the polarization film 443A can be increased, thereby further enhancing the cooling efficiency of the liquid crystal panels 441R, 441G and 441B and the polarization film 443A.

Figure 19:
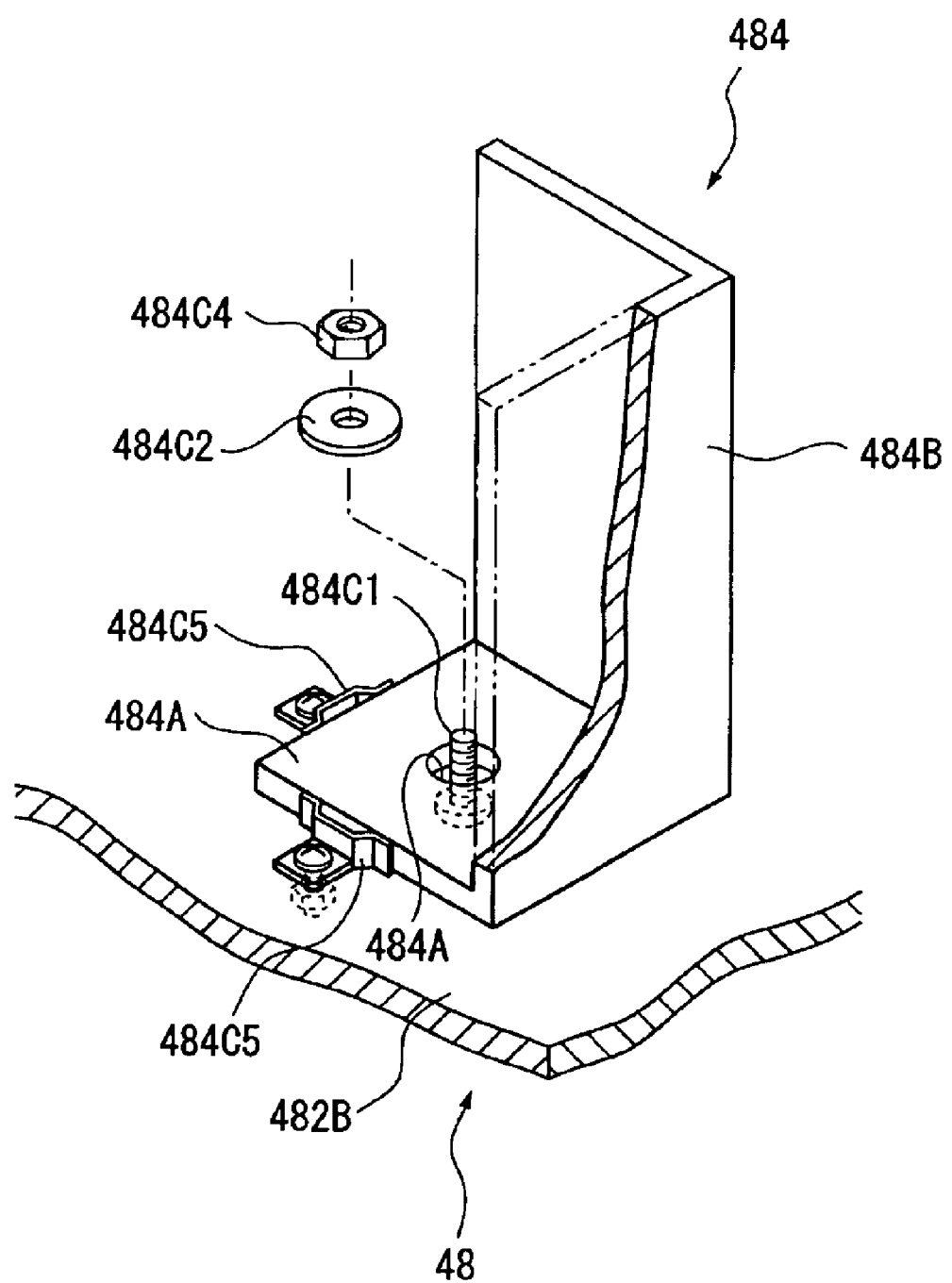
FIG. 19 is an exploded perspective view showing an attachment structure of a heat-conductive frame according to a modification of the present invention.

Though the heat-conductive frames 484 and 485 are advanceable and retractable along the bottom side 482B by the deformation of the elastic ring 484C3 provided on the insert hole 484A1 of the attachment portion 484A and are capable of returning to a predetermined position by the elastic force of the elastic ring 484C3 in the above embodiments, metal spring as shown in FIG. 19 may be used for the heat-conductive frames 484 and 485.

FIG. 19 is a perspective view of the heat-conductive frame 484.

As shown in FIG. 19, the heat-conductive frame 484 is attached to the bottom side 482B of the lower light guide 48 by the screw 484C1, the washer 484C2 and the nut 484C4 through the insert hole 484A1 provided on the attachment portion 484A. A metal spring 484C5 screwed on the bottom side 482B abuts to the two peripheries of the attachment portion 484A facing the wall 484B of the heat-conductive frame 484.

Accordingly, the heat-conductive frame 484 is capable of advancement and retraction along the bottom side 482B by the deformation of the metal spring 4845 and is capable of returning to a predetermined position by the elastic force of the metal spring 484C5.

Though the two spacers 449 are provided on the right and left side of the holding frame 446 and is provided on the slanted surface 446D formed on the right and left peripheries of the holding frame 446 in the above embodiments, the spacer may be arranged on the right and left peripheries as a plurality of spacers shorter than the length of the right and left peripheries of the holding frame 446, or may be a pin spacer.

According to the above arrangement, the contact surface between the holding frame 446 and the sapphire plate 443B can be reduced and heat-conductance between the liquid crystal panels 441R, 441G and 441B and the polarization plate 443 can be further reduced, so that heat conduction between the components can be prevented, thereby further enhancing the cooling efficiency of the optical device 44.

Though the polarization plate 443 and the liquid crystal panels 441R, 441G and 441B are connected with the bases 445 provided on top and bottom sides of the cross dichroic prism 444, the polarization plate 443 and the liquid crystal panels 441R, 441G and 441B may be connected only to the base 445 on the top side of the cross dichroic prism 444 or may be connected only to the base 445 on the bottom side of the cross dichroic prism 444.

Though a projector having three optical modulators is taken as an example in the above embodiment, the present invention may be applied to a projector having only one optical modulator, a projector having two optical modulators, or a projector having more than three optical modulators.

Though the liquid crystal panel is used as the optical modulator, an optical modulator such as a device using a micro-mirror may be used.

Though the transmissive optical modulator having different light-incident side and the light-irradiation side is used in the above embodiment, a reflective optical modulator having common light-incident and light-irradiation side may be used.

Though a front-type projector for projecting the image in a direction for observing a screen is taken as an example, the present invention may be applied to a rear-type projector here the image is projected on a side opposite to a side for observing a screen.

What is claimed is:

1. An optical device, comprising:
a plurality of optical modulators that modulate a plurality of color lights for each color light in accordance with image information;
a color combining optical device having a plurality of light-incident sides facing the respective optical modulators, the color combining optical device combining the color lights modulated by the optical modulators, the color combining optical device being integrated with the optical modulators;
an optical converting element provided between the optical modulator and the light-incident side, the optical converting element having a substrate on which an optical conversion film that converts optical characteristics of a light beam irradiated by the optical modulator,
the optical modulator is connected through a heat-conductive material to an optical component casing accommodating optical components disposed on an optical path from a light source to the optical modulator, at least a part of the optical component casing being made of a heat-conductive material, and
the optical modulator is attached to the color combining optical device through a position-adjusting spacer made of a heat-insulative material.

2. The optical device according to claim 1,
wherein the optical converting element is connected through a heat-conductive material to a base made of a heat-conductive material provided on at least one of a pair of sides of the color combining optical device intersecting the plurality of light-incident sides.

3. The optical device according to claim 1, wherein the optical modulator has an optical modulating element that conducts optical modulation, an opening corresponding to an image formation area of the optical modulating element, and a holding frame.
wherein the holding frame is made of a heat-conductive material.

4. The optical device according to claim 3, wherein an adhesive receiver that accumulates an adhesive for bonding the optical modulating element is formed around the opening of the holding frame.

5. The optical device according to claim 4, wherein the adhesive receiver is a consecutive groove or a crater-shaped concave portion arranged in a dotted manner.

6. The optical device according to claim 3, wherein the optical modulator has a light-transmissive dustproof plate attached to a light-incident and/or light-irradiation surface of the optical modulating element to prevent dusts from adhering on the surface of the optical modulating element, the dustproof plate being connected with the holding frame through a heat-conductive adhesive provided on the outer circumference of the dustproof plate.

7. The optical device according to claim 6, wherein the heat-conductive adhesive is any one of silicone adhesive, solder and brazing filler metal.

8. The optical device according to claim 6, wherein the dustproof plate and the holding frame are connected through a frame-shaped silicone rubber.

9. The optical device according to claim 1, wherein the spacer has a contact surface having a predetermined area capable of supporting the optical modulator, the contact surface being bonded to the light-incident surface or a substrate surface of the optical modulator by a light-curing adhesive to attach the spacer to the color combining optical device.

10. The optical device according to claim 1, wherein the optical modulator has an optical modulating element that conducts optical modulation and a control cable that transfers a control signal for controlling the optical modulation of the optical modulating element, wherein a heat-conductive coating of a heat-conductive material connected with the optical modulating element is provided on the control cable.

11. A projector that modulates a light beam irradiated by a light source in accordance with image information to form an optical image comprising:

the optical unit having an optical device according to claim 10; and an optical component casing that accommodates optical components disposed on an optical path from a light source to the optical modulator, at least a part of the optical component casing being made of a heat-conductive material, wherein the heat-conductive coating provided on the control cable of the optical device has a distal end branched from the control cable to be connected with an exterior case accommodating the optical unit and/or the optical component casing.

12. An optical unit comprising the optical device according to claim 1, and an optical component casing that accommodates optical components disposed on an optical path from a light source to the optical modulator, at least a part of the optical component casing being made of a heat-conductive material, wherein the optical modulator of the optical device is connected with the optical component casing through a heat-conductive plate made of a heat-conductive material.

13. The optical unit according to claim 12, wherein the optical modulator has an optical modulating element that conducts optical modulation and a holding frame having an opening corresponding to an image formation area of the optical modulating element, wherein the heat-conductive plate is fixed to the holding frame and is connected with the optical component casing through a heat-conductive elastic material.

14. The optical unit according to claim 12, wherein the heat-conductive plate extends along the light-incident surface of the optical modulator and a heat-conductive wall intersecting the direction in which the heat-conductive plate extends to be connected with the optical component casing is provided on the extension of the extending direction of the heat-conductive plate, wherein the heat-conductive plate and the wall are not connected during room temperature condition where no light beam is irradiated on the optical modulator and the heat-conductive plate is connected with the wall when the heat-conductive plate is thermally expanded by a heat generated by irradiation of a light beam on the optical modulator.

15. The optical unit according to claim 12, wherein the heat-conductive plate extends along the light-incident surface of the optical modulator and has a heat-conductive wall to be connected with the optical component casing along a direction in which the heat-conductive plate extends, wherein a distal end of the heat-conductive plate in the extending direction is slidably connected with the wall along the extending direction.

16. The optical unit according to claim 12, wherein the heat-conductive plate extends along the light-incident surface of the optical modulator and a heat-conductive wall intersecting the direction in which the heat-conductive plate extends to be connected with the optical component casing is provided on the extension of the extending direction of the heat-conductive plate, wherein a bent portion bent at a predetermined angle is formed on the distal end of the heat-conductive plate in the extending direction, the bent portion being connected with the wall while being biased.

17. The optical unit according to claim 12, wherein the heat-conductive plate is connected with the optical component casing through a heat-conductive frame, at least a part of the optical component casing being made of a heat-conductive material, wherein the heat-conductive frame is attached to the optical component casing in a manner capable of advancement and retraction along the extending direction of the heat-conductive plate.

18. The optical unit according to claim 12, wherein the heat-conductive plate is made of a material selected from the group consisting of copper, aluminum, magnesium, and alloy thereof.

19. A projector that modulates a light beam irradiated by a light source in accordance with image information to form an optical image, comprising: the optical unit according to claim 12.

20. A projector that modulates a light beam irradiated by a light source in accordance with image information to form an optical image, comprising an optical unit, the optical unit comprising: the optical device according to claim 1; and an optical component casing that accommodates optical components disposed on an optical path from a light source to the optical modulator, at least a part of the optical component casing being made of a heat-conductive material.

21. The projector according to claim 20, further comprising: an exterior case that accommodates the optical unit, wherein a gap is formed between the optical component casing and the exterior case and a cooling fan for sending cooling air to the gap is provided.

* * * * *